United States Patent
Kawamura et al.

(10) Patent No.: US 7,876,659 B2
(45) Date of Patent: Jan. 25, 2011

(54) OPTICAL PICKUP AND OPTICAL DRIVE

(75) Inventors: Tomoto Kawamura, Tokyo (JP);
Masataka Sugita, Yokohama (JP)

(73) Assignee: Hitachi Media Electronics Co., Ltd.., Iwate (JP)

( * ) Notice: Subject to any disclaimer, the term of this patent is extended or adjusted under 35 U.S.C. 154(b) by 341 days.

(21) Appl. No.: 12/121,833

(22) Filed: May 16, 2008

(65) Prior Publication Data

US 2008/0285420 A1 Nov. 20, 2008

(30) Foreign Application Priority Data

May 18, 2007 (JP) ............................... 2007-132285

(51) Int. Cl.
G11B 7/135 (2006.01)
G11B 7/00 (2006.01)

(52) U.S. Cl. ............................ 369/112.05; 369/112.07; 369/44.41

(58) Field of Classification Search ............. 369/112.05
See application file for complete search history.

(56) References Cited

U.S. PATENT DOCUMENTS 7,365,296 B2  4/2008 Tsukihashi et al.

2007/0019530 A1 * 1/2007 Kawamura et al. .......... 369/120

FOREIGN PATENT DOCUMENTS

| CN | 1892848    | 1/2007 |
| CN | 1905026    | 1/2007 |
| JP | 2003-272218| 9/2003 |
| JP | 2005-85369 | 3/2005 |
| JP | 2007-35109 | 2/2007 |

* cited by examiner

*Primary Examiner*—Daniell L Negrón
*Assistant Examiner*—Nicholas Lee
(74) *Attorney, Agent, or Firm*—Antonelli, Terry, Stout & Kraus, LLP.

(57) ABSTRACT

An optical pickup including a two-wavelength multilaser for generating a tracking error signal and a focusing error signal with high accuracy without light quantity variations which otherwise might be caused by the interference. An optical beam of first wavelength is emitted from first laser light source, and an optical beam of second wavelength longer than the first wavelength is emitted from second laser light source. The optical beams of the first and second wavelength are each split into at least one main optical beam and two sub-optical beams by a grating having, in a single plane, a first grating pattern area for splitting the optical beam of the first wavelength and a second grating pattern area for splitting the optical beam of the second wavelength. The area of the first grating pattern area is larger than the area of the second grating pattern area.

6 Claims, 22 Drawing Sheets

DVD-GRATING

CD-GRATING

DVD-R

CD-R

FIG.8A
FIG.8B
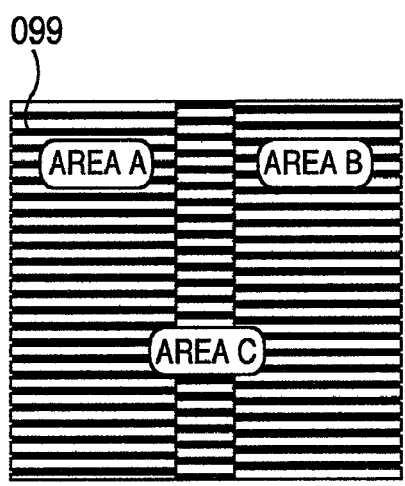
DVD-GRATING
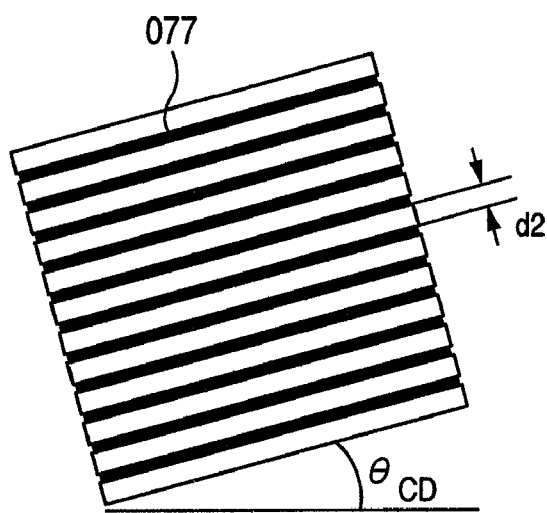
CD-GRATING (a) EFFECTIVE DIAMETER OF INCIDENT OPTICAL BEAM IS SMALL (b) EFFECTIVE DIAMETER OF INCIDENT OPTICAL BEAM IS LARGE.

OPTICAL PICKUP AND OPTICAL DRIVE

CROSS-REFERENCE TO RELATED APPLICATION

The present application relates to U.S. Ser. No. 11/369,077 filed Mar. 7, 2006 entitled "photodetector, diffraction grating, optical pickup and optical disc apparatus" by Tomoto Kawamura, Kunikazu Ohnishi, Masayuki Inoue and Katsuhiko Izumi, assigned to the same assignee of the present application and published as US 2007/0019530 A1 on Jan. 25, 2007.

INCORPORATION BY REFERENCE

The present application claims priority from Japanese application JP2007-132285 filed on May 18, 2007, the content of which is hereby incorporated by reference into this application.

BACKGROUND OF THE INVENTION

This invention relates to an optical pickup and an optical drive used for the reproduce or record operation of an optical disc.

A conventional optical pickup carrying a two-wavelength multilaser is known in which a DPP (differential-push-pull) method is used for generating a tracking error signal and an astigmatic detection method for generating a focusing error signal. In such an optical pickup, the detection area pattern of the detector is formed of two columns each having three detection areas in a row (hereinafter referred to as the 3-by-2 detection area pattern), and the tracking error signal and the focusing error signal are generated by the signal of each detection area (see, for example, JP-A-2003-272218, or especially, Claim 13, FIGS. 5 and 6 thereof).

Also, a technique has been disclosed in which the 3-by-2 detection area pattern described in JP-A-2003-272218 is simplified to reduce the cost of the detector (see, for example, JP-A-2005-85369, or especially, Claim 9, FIG. 2 thereof).

SUMMARY OF THE INVENTION

In the case where the two-wavelength multilaser light source is used, however, the optical paths of DVD and CD are substantially coincident with each other, and therefore, the grating dedicated to DVD (hereinafter referred to as the DVD grating) is entered by not only the optical beam of the DVD but also the optical beam of the CD, while the grating dedicated to CD (hereinafter referred to as the CD grating) is entered by not only the optical beam of the CD but also the optical beam of the DVD. As a result, the optical beam of the DVD generates a sub-optical beam 1 in the DVD grating and a sub-optical beam 2 in the CD grating. Although the sub-optical beam 1 is used for tracking control, the sub-optical beam 2 constitutes an extraneous disturbance component. Specifically, when the optical beam passed through each grating, an extraneous disturbance component is generated and enters the detector of DVD and CD, respectively. This disturbance component may be added as an extraneous signal component.

Upon generation of an area where the sub-optical beam 1 and the sub-optical beam 2 are overlapped with each other on the detector, a slight change in the optical path length in the overlapped area may cause the sub-optical beam 1 and the sub-optical beam 2 to interfere with each other. In the case where disc-tilt, axial-runout of the disc surface or the like is generated, therefore, the light quantity detected by the detector may be considerably changed and a great variation may occur in the tracking error signal and the focusing error signal. Then, the steady position control becomes difficult, with the probable result that the satisfactory reproduce and record operation cannot be performed.

This problem remains unsolved by JP-A-2003-272218 and JP-A-2005-85369. According to the technique described in JP-A-2003-272218, for example, as shown in FIG. 14, not only the original sub-optical beam 1 but also the sub-optical beam 2 is overlapped in the detection area for DVD (left part of the 3-by-2 detection area pattern, where 3-by-2 denotes 3 rows×2 columns). Also, not only the original sub-optical beam 1 but also the sub-optical beam 2 is overlapped in the detection area for CD (right part of the 3-by-2 detection area).

Further, in the technique described in JP-A-2005-85369, as shown in FIG. 2B, beams 050 and 051 are generated as the sub-optical beams 2 from the DVD optical beam by the CD-dedicated grating, and beams 052 and 053 as the sub-optical beams 2 from the CD optical beam by the DVD-dedicated grating. As a result, areas are created where the sub-optical beam 2 is overlapped as well as the original sub-optical beam 1.

This invention has been achieved in view of the problem described above, and the object thereof is to provide a detector, a grating, an optical pickup and an optical drive capable of realizing the stable reproduce or record operation of an optical information recording medium.

In order to achieve this object, according to one aspect of the invention, there is provided an optical pickup comprising a first laser light source for emitting an optical beam having a first wavelength, a second laser light source for emitting an optical beam having a second wavelength longer than the first wavelength, an objective lens for focusing the optical beams of the first and second wavelength on the information-recorded surface of the optical disc, a detector for receiving the optical beams of the first and second wavelength reflected on the information-recorded surface of the optical disc, and a grating arranged between the objective lens and the first and second laser light sources, respectively, for emitting the optical beams of the first and second wavelength to split each of the optical beams of the first and second wavelength into at least one main optical beam and two sub-optical beams.

In the grating, a first grating pattern area for splitting the optical beam of the first wavelength and a second grating pattern area for splitting the optical beam of the second wavelength are arranged in a single plane, and the first and second grating pattern areas have a predetermined grating groove depth and a predetermined duty factor.

The first grating pattern area is larger in size than the second grating pattern area of the grating.

Let η (the light quantity of the main optical beam divided by the incident light quantity) be the ratio between the light quantity of the optical beam of the first wavelength incident to the grating and the light quantity of the main optical beam of the first wavelength contained in the incident optical beam split by the grating. An arrangement is made to hold the relation $\eta \leq 0.83$.

According to this invention, there are provided a detector, a grating, an optical pickup and an optical drive which can realize the stable reproduce or record operation of an optical information recording medium.

Other objects, features and advantages of the invention will become apparent from the following description of the embodiments of the invention taken in conjunction with the accompanying drawings.

BRIEF DESCRIPTION OF THE DRAWINGS

FIGS. 8A and 8B are diagrams for explaining the grating patterns according to a fourth embodiment.

DESCRIPTION OF THE EMBODIMENTS

Figure 1:
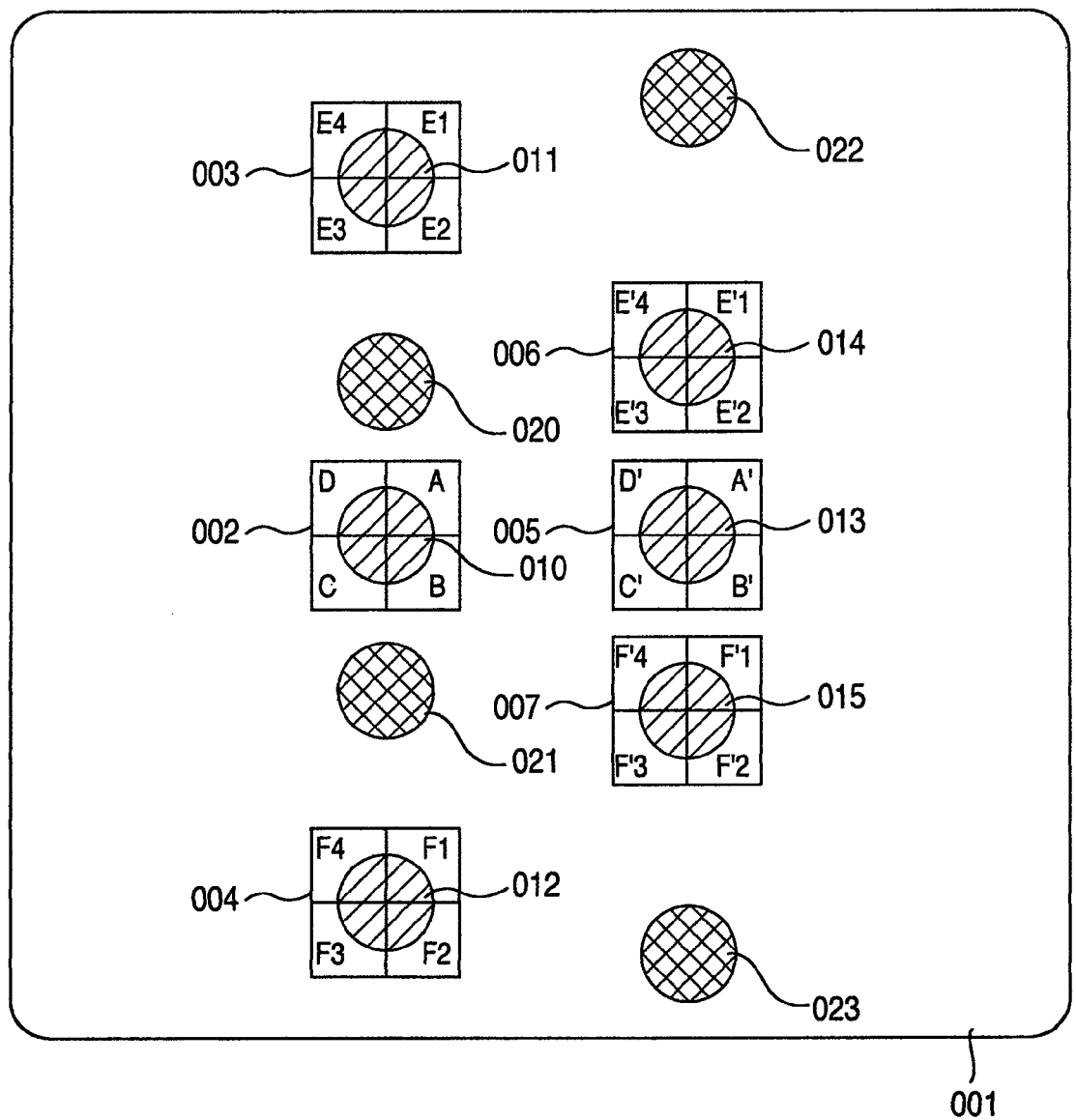
FIG. 1 is a diagram for explaining a detector according to a first embodiment.

The optical drive, the optical pickup mounted on the optical drive, the detector mounted on the optical pickup and the grating adapted for the record or reproduce operation of the DVD (digital versatile disc) and the CD (compact disc) according to each embodiment of the invention are explained below.

The embodiments shown in the drawings are explained in detail below. The invention is not limited to these embodiments.

First Embodiment

The first embodiment of the invention is explained in detail with reference to the drawings. The detector is taken as an example.

FIG. 1 shows the detector according to the first embodiment. The detector 001 has six detection areas 002, 003, 004, 005, 006, 007. Each detection area is divided into four parts. The detection area 002 has detection surfaces A, B, C, D, the detection area 003 detection surfaces E1, E2, E3, E4, the detection area 004 detection surfaces F1, F2, F3, F4, the detection area 005 detection surfaces A', B', C', D', the detection area 006 detection surfaces E'1, E'2, E'3, E'4, and the detection area 007 detection surfaces F'1, F'2, F'3, F'4.

The detection areas 002, 003, 004 receive the optical beams of the DVD. The detection area 002 receives the main optical beam 010 of the DVD, and the detection areas 003, 004 receive the sub-optical beams 011, 012, respectively, of the DVD.

The detection areas 005, 006, 007, on the other hand, receive the optical beams of the CD. The detection area 005 receives the main optical beam 013 of the CD, and the detection areas 006, 007 receive the sub-optical beams 014, 015 of the CD.

The DVD and the CD are assumed to employ the differential astigmatic detection method for generating the focusing error signal, and the DPP method for generating the tracking error signal. The differential astigmatic detection method is a well-known technique and therefore not explained in detail. As detection signals from the detector 001, the total light quantity of the main optical beam, the focusing error signal and the tracking error signal are detected for both the DVD and CD optical systems. The detection signal can be obtained from Equations 1 to 6 described below.

$$\text{DVD total main light quantity} = A+B+C+D \quad (1)$$

$$\text{CD total main light quantity} = A'+B'+C'+D' \quad (2)$$

$$\text{DVD focusing error signal} = [(A+C)-(B+D)]+k\times\{[(E1+E3)-(E2+E4)]+[(F1+F3)-(F2+F4)]\} \quad (3)$$

$$\text{CD focusing error signal} = [(A'+C')-(B'+D')]+k'\times\{[(E'1+E'3)-(E'2+E'4)]+[(F'1+F'3)-(F'2+F'4)]\} \quad (4)$$

$$\text{DVD tracking error signal} = [(A+D)-(B+C)]-k\times\{[(E1+E4)-(E2+E3)]+[(F1+F4)-(F2+F3)]\} \quad (5)$$

$$\text{CD tracking error signal} = [(A'+D')-(B'+C')]-k'\times\{[(E'1+E'4)-(E'2+E'3)]+[(F'1+F'4)-(F'2+F'3)]\} \quad (6)$$

In these equations, k and k' are coefficients for correcting the light quantity ratio between the main optical beam and the sub-optical beams.

In the case where the DPP method is employed for generating the tracking error signal with the two-wavelength multilaser, a 3-by-2 detection area pattern as shown in FIG. 1 is required. Two columns of the detection areas are required due to the difference between the point where the DVD optical beam is emitted and the point where the CD optical beam is emitted in the two-wavelength multilaser. Also, the sub-optical beams are required for generating the tracking error signal by the DPP method for both DVD and CD.

In the DPP method, the grating is used for generating the main optical beam and the sub-optical beams. The DVD and the CD have different intervals of guide grooves, and therefore, the optimum radiation points of the main optical beam and the sub-optical beams on the disc are different between DVD and CD. As a result, the gratings of different patterns are required for DVD and CD.

Also, in the case where the two-wavelength multilaser light source is used, the optical paths of DVD and CD are substantially coincident with each other. As a result, the grating is necessarily required to be arranged on the same optical path of the CVD and the CD.

Specifically, the DVD-dedicated grating is entered by not only the DVD optical beam but also the CD optical beam, while the CD-dedicated grating is entered by not only the CD optical beam but also the DVD optical beam. From the DVD optical beam, therefore, the DVD sub-optical beams 011, 012 are generated by the DVD grating, and the disturbance optical beams 020, 021 by the CD grating. From the CD optical beam, on the other hand, the CD sub-optical beams 014, 015 are generated by the CD grating, and the disturbance optical beams 022, 023 by the DVD grating.

In the case where the disturbance optical beam is overlapped with the sub-optical beam, for example, on the detector, the tracking error signal and the focusing error signal are considerably changed by the interference. The detector according to this embodiment has been conceived to avoid the overlapping of the disturbance optical beam with the main optical beam and the sub-optical beam on the detector.

According to this embodiment, there is provided a detector including three detection areas 002, 003, 004 arranged at predetermined intervals in one column for receiving the DVD optical beams, and three detection areas 005, 006, 007 arranged in another one column at predetermined intervals, adjacently to the detection areas 002, 003, 004, for receiving the CD optical beam, wherein the three detection areas 002, 003, 004 are arranged at intervals different from the three detection areas 005, 006, 007.

More specifically, the detection areas 002, 003, 004 are arranged in such positions as to be entered by the optical beams 011, 012 generated from the optical beam emitted from the DVD laser light source and split by the DVD grating, but not to be entered by the optical beams 020, 021 generated by being split by the CD grating.

In other words, the DVD optical beams diffracted by the CD grating are radiated outside the detection areas 002 to 004, or specifically, in the areas between the detection areas 002, 003 and between the detection areas 002, 004, while the CD optical beams diffracted by the DVD grating is radiated outside the detection areas 013 to 015. In order that the optical beams are radiated as shown in FIG. 1, some modification is required in the structure of the grating, as described later.

Also, in the detector according to this embodiment, the intervals of the three detection areas 005, 006, 007 of the CD optical beam longer in wavelength than the DVD optical beam are reduced.

Figure 2A:
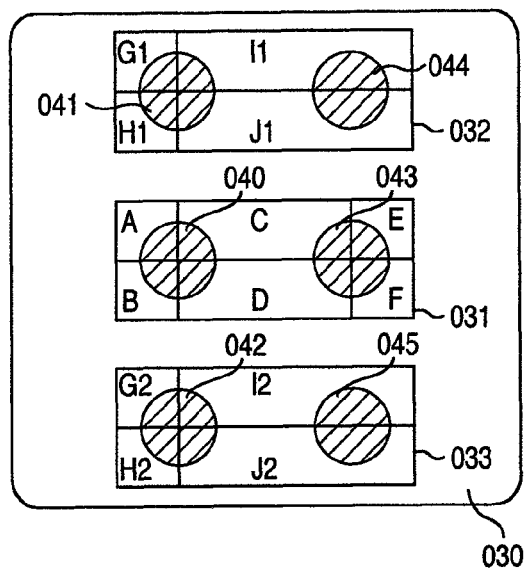
FIGS. 2A and 2B are diagrams for explaining a conventional detector.
Figure 2B:
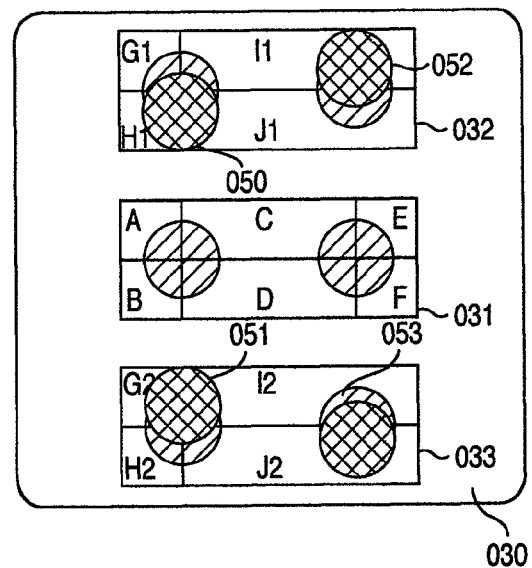

FIGS. 2A, 2B illustrate an example of the conventional detector described in JP-A-2005-85369. FIG. 2A shows the light spot positions on the detector using an ideal grating, and FIG. 2B the light spot positions on the detector 030 using an actual grating.

First, FIG. 2A is explained.

The detector 030 is configured of three detection areas 031, 032, 033. The detection area 031 has detection surfaces A, B, C, D, E, F, the detection area 032 the detection surfaces G1, H1, I1, J1, and the detection area 033 the detection surfaces G2, H2, I2, J2.

The detection area 031 receives the DVD main optical beam 040 and the CD main optical beam 043, while the detection areas 032, 033 receive the pair of the DVD sub-optical beam 041 and the CD sub-optical beam 044 and the pair of the DVD sub-optical beam 042 and the CD sub-optical beam 045, respectively.

The detector 030 has only three detection areas while the detector 001 has six detection areas.

Also, the detector 030 is assumed to employ the differential astigmatic detection method for generating the focusing error signal and the DPP method for generating the tracking error signal for DVD on the one hand, and the astigmatic detection method for generating the focusing error signal and the DPP method for generating the tracking error signal for CD on the other hand. For this reason, the detection areas 044, 045 are each divided into four parts for the DVD sub-optical beams, and two parts for the CD sub-optical beams.

In the case where the DPP method is employed for generating the tracking error signal with the two-wavelength multilaser, the disturbance optical beam is generated as described above. As shown in B of FIG. 2, therefore, the disturbance optical beams 050, 051 are generated from the DVD optical beam by the CD grating, and the disturbance optical beams 052, 053 from the CD optical beam by the DVD grating.

These disturbance optical beams have an area overlapped with the sub-optical beam. It is understood, for example, that the DVD sub-optical beam 041 is overlapped with the disturbance optical beam 050. In the case where the optical beams are overlapped on the detector, the light quantity is greatly changed by the interference. As a result, the tracking error signal and the focusing error signal using the detection signal based on the sub-optical beam undergo a great change, thereby making impossible the stable position control operation.

Incidentally, the DVD (660 nm) handles an optical beam shorter in wavelength than the CD (785 nm), and therefore, the disturbance optical beams 050, 051 are slightly smaller in diffraction angle than the DVD sub-optical beams 041, 042.

In the case where the optical intensity of two optical beams are expressed as $a^2$ and $b^2$, the light quantity I changed by the interference between the two optical beams holds the relation expressed by Equation 7.

$$I = a^2 + b^2 + 2ab \cdot \cos(k\sigma) \qquad (7)$$

where k is the wave number and $\sigma$ is the difference of the optical path length between the two optical beams.

In the actual grating, only a slight amount of the disturbance optical beam is generated. Assume that the light quantity incident to the grating is 100 and that the main optical beam generated is 91, the sub-optical beams generated is 8 and the disturbance optical beam as small as 1. The disturbance optical beam represents only about 1% of the main optical beam, but about 10% of the sub-optical beams. Applying this relation to Equation 7 ($a^2=8$, $b^2=1$), the light quantity I changes by a maximum of about 15 and a minimum of about 3 considering the worst optical path change. Specifically, the light quantity of the sub-optical beam is decreased or increased by 50% due to the interference, thereby making it difficult to generate the focusing error signal and the tracking error signal in stable fashion.

The first embodiment assumes the use of the differential astigmatic detection method for generating the focusing error signal, and therefore, the detection areas 003, 004, 006, 007 are each divided into four parts. In the case where the astigmatic detection method using only the main optical beam is employed, however, the detection areas may of course be divided into only two parts, upper and lower. For example, the divisions E1 and E4 or the divisions E2 and E3 may be done without.

In the detector 001, the detection areas 002, 005 for receiving the DVD main optical beam 010 and the CD main optical beam 13, respectively, are each divided into four parts, and in the reproduce operation of the DVD-ROM or CD-ROM, the DPD (differential phase detection) method can also be used for generating the tracking error signal.

Second Embodiment

As a second embodiment, an explanation is given about an optical pickup carrying the two-wavelength multilaser adapted for the optical drive capable of the record and reproduce operation of DVD and CD. This optical pickup includes the detector described in the first embodiment.

Figure 3:
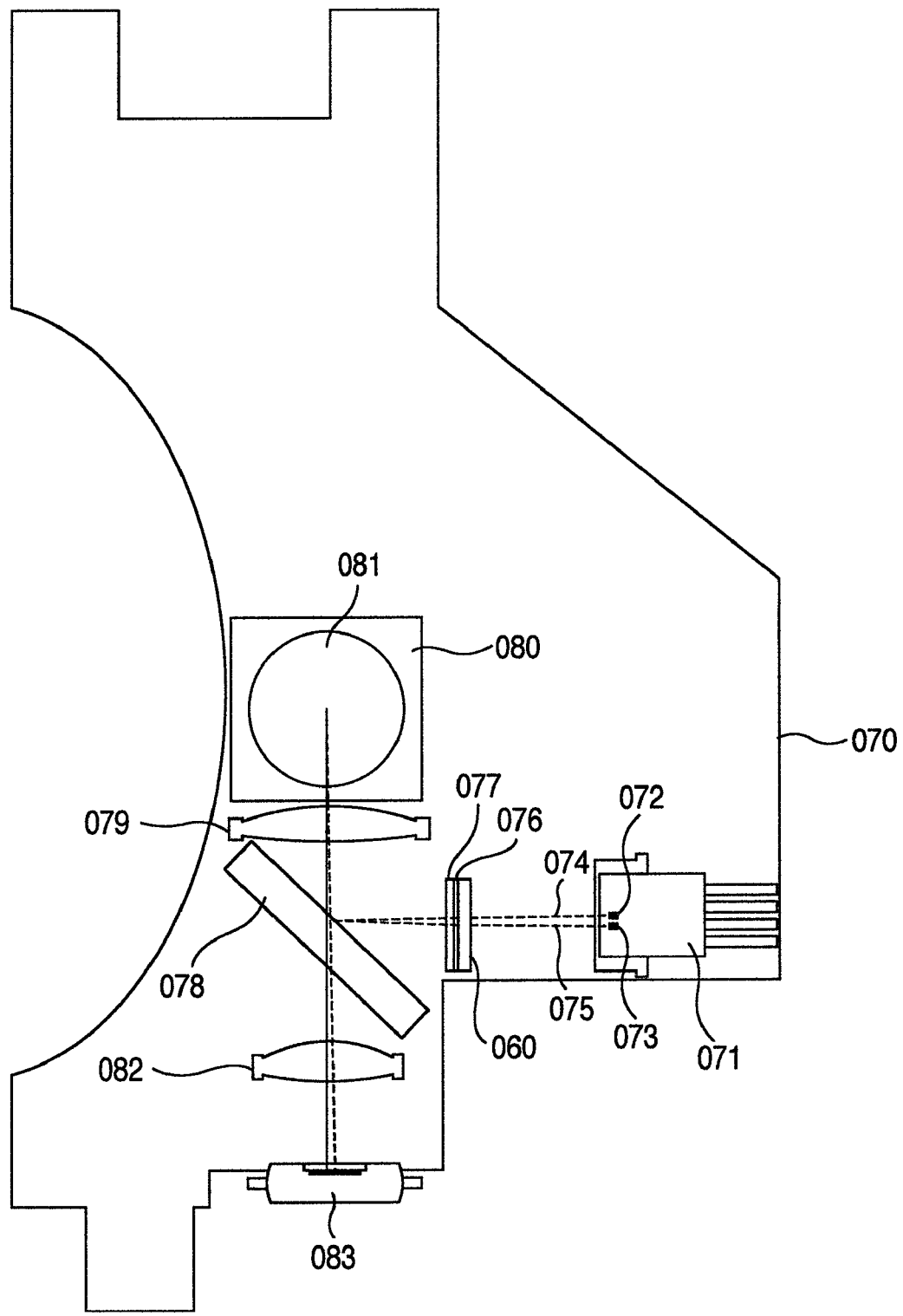
FIG. 3 is a diagram showing a general configuration of an optical pickup according to a second embodiment.

FIG. 3 is a diagram showing an optical configuration of the optical pickup 070. In recording the information into or reproducing the information from a DVD optical disc, it is common practice to use a semiconductor laser having the wavelength of about 660 nm. In the case of the CD optical disc, on the other hand, a semiconductor laser having the wavelength of about 785 nm is generally used. The two-wavelength multilaser 071 is a laser light source having two laser chips including a DVD laser chip 072 for emitting the optical beam about 660 nm in wavelength for DVD and a CD laser chip 073 for emitting the optical beam about 785 nm in wavelength for CD.

First, the DVD optical system is explained. The DVD optical beam is emitted as divergent light rays from the DVD laser chip 072 built in the two-wavelength multilaser 071. In FIG. 3, the dotted line 074 represents the optical path of the DVD optical beam. The DVD optical beam emitted from the DVD laser chip 072 enters the grating 060.

The grating 060 has the function of splitting the optical beam into three beams, and the resulting three optical beams are used for generating the tracking error signal by the DPP method or the focusing error signal by the differential astigmatic detection method. The grating 060 is formed of a DVD grating and a CD grating attached to each other, and has arranged therein a DVD grating pattern 076 and a CD grating pattern 077.

The DVD optical beam that has entered the grating 060 is split by the DVD grating pattern 076 into three optical beams most suitable for generating the DVD tracking error signal according to the DPP method. The DVD optical beam that has passed through the DVD grating pattern 076 is passed through the CD grating pattern 077. Even in the case where the groove depth and the duty factor of the CD grating pattern 077 are ideally determined to pass 100% of the DVD optical beam, a slight amount of the disturbance optical beam is actually generated.

The DVD optical beam that has passed through the CD grating pattern 077 is reflected on the beam splitter 078 and by being introduced to the collimating lens 079, converted into a substantially collimating beam. The DVD optical beam that has emitted from the collimating lens 079 is reflected on a reflection mirror 080 in the direction of z in FIG. 3 (the direction perpendicular to the page) and focused on an optical disc (not shown) by an objective lens 081 mounted on an actuator (not shown).

The DVD optical beam is reflected on the optical disc, and reaches the detector 083 through the objective lens 081, the reflection mirror 080, the collimating lens 079, the beam splitter 078 and the detection lens 082. The optical beam is subjected to a predetermined astigmatism when passing through the beam splitter 078, and used for detecting the focusing error signal of the optical disc by the differential astigmatic detection method. The detection lens 082 has the function of rotating the astigmatism in a predetermined direction while at the same time determining the size of the light spot on the detector 083. The DVD optical beam led to the detector 083 is used to detect the information signal recorded on the optical disc and the position control signals for the light spots on the optical disc such as the tracking error signal and the focusing error signal.

Next, the CD optical system is explained. The CD optical beam is emitted as a divergent light from the CD laser chip 073 included in the two-wavelength multilaser 071. In FIG. 3, the one-dot chain 075 designates the optical path of the CD optical beam. The CD optical beam emitted from the CD laser chip 073 enters the grating 060. As compared with the DVD optical beam, the CD optical beam has an emission angle tilted by reason of the fact that the DVD laser chip 072 and the CD laser chip 073 are arranged at the distance of 110 μm from each other in the direction x in FIG. 3. Assuming that the DVD optical beam enters the objective lens 081 with the optical axis thereof perpendicularly to the center of the objective lens 081, therefore, the center of the CD optical beam is tilted. Incidentally, the distance of 110 μm between the DVD laser chip and the CD laser chip is an interval generally employed for the two-wavelength multilaser by the laser makers.

The grating 060 has the function of splitting an optical beam into three beams as described above. The three optical beams are used for generating the tracking error signal by the DPP method or the focusing error signal by the differential astigmatic detection method. The CD optical beam that has entered the grating 060 first enters the DVD grating pattern 076. Even in the case where the groove depth and the duty factor of the DVD grating pattern 076 are ideally determined to transmit 100% of the CD optical beam, a slight amount of the disturbance optical beam is actually generated. The CD optical beam passed through the DVD grating pattern 076 enters the CD grating pattern 077. The CD optical beam is split by the CD grating pattern 077 into three optical beams most suitable for generating the CD tracking error signal according to the DPP method.

The CD optical beam passed through the CD grating pattern 077 is reflected on the beam splitter 078 and by being led to the collimating lens 079, converted into a substantially parallel beam. The CD optical beam emitted from the collimating lens 079 is reflected on the reflection mirror 080 in the direction z in FIG. 3 (the direction perpendicular to the page), and focused on the optical disc (not shown) by the objective lens 081 mounted on an actuator (not shown).

The CD optical beam is reflected on the optical disc, and reaches the detector 083 through the objective lens 081, the reflection mirror 080, the collimating lens 079, the beam splitter 078 and the detection lens 082. The optical beam is subjected to a predetermined astigmatism when passing through the beam splitter 078 and used for generating the focusing error signal of the optical disc by the differential astigmatic detection method. The detection lens 082 has the function of rotating the astigmatism of the CD optical beam in a predetermined direction while at the same time determining the size of the light spot on the detector 083. The CD optical beam led to the detector 083 is used for detecting the information signal recorded on the optical disc on the one hand and the position control signals for the light spots focused on the optical disc such as the tracking error signal and the focusing error signal on the other hand.

In view of the fact that the CD laser chip 073 is arranged at a different position from the DVD laser chip 072, the CD optical beam is focused at a position different from the DVD optical beam on the detector 083. For the optical pickup using the two-wavelength multilaser, therefore, a detector having two columns of detection areas is required.

As described above, in the optical pickup carrying the two-wavelength multilaser, the light paths of the DVD optical beam and the CD optical beam substantially coincide with each other, and therefore, the DVD optical beam is unavoidably passed through the CD grating pattern as well as the DVD grating pattern. Similarly, the CD optical beam is unavoidably passed through the DVD grating pattern as well as the CD grating pattern. As a result, the generation of the disturbance light is unavoidable.

In the optical pickup according to this embodiment, as explained in the first embodiment, the interference of the disturbance optical beam with other optical beams on the detector is avoided. Like in the conventional optical pickup, therefore, the highly accurate, stable detection of the tracking error signal and the focusing error signal is made possible.

In the second embodiment, the optical pickup adapted for the optical drive capable of the record and reproduce operation of the DVD and CD is explained above. Nevertheless, the second embodiment of course is applicable also to an optical pickup adapted for the CD and the next-generation high-density optical drive (BD and HD-DVD) using the blue semiconductor laser as well.

Incidentally, in the information recording and reproducing apparatus using an ordinary optical pickup, the optical beam radiated on the optical disc is required to be controlled at a predetermined light quantity to assure a stable recording and reproducing process. The optical pickup includes therein a means (generally called the front monitor) for detecting the light quantity of the optical beam emitted from the laser light source, and the light quantity of the optical beam radiated on the optical disc is accurately controlled by feeding back the detected light quantity to the laser light source. However, this configuration is not related directly to this embodiment and will not be described any further. Nevertheless, this embodiment is applicable to an optical pickup having such a front monitor without any problem.

Although FIG. 2 shows a configuration in which the DVD optical beam and the CD optical beam enter the beam splitter 078 at the angle of 45°, the incidence angle may be set to smaller than 45° such as 40° or 35° with equal effect. By reducing the incidence angle to smaller than 45° in this way, the reflection/transmission film characteristic determining the reflection/transmission performance of the DH mirror can be designed advantageously with a greater ease.

Also, unlike this embodiment in which the DVD diffraction pattern and the CD diffraction pattern are formed in a single grating, two gratings including the one dedicated to DVD and the other dedicated to CD may of course be arranged without any problem.

Third Embodiment

The disturbance optical beam generated by the grating according to the third embodiment is explained below with reference to the drawings.

Figure 4A:
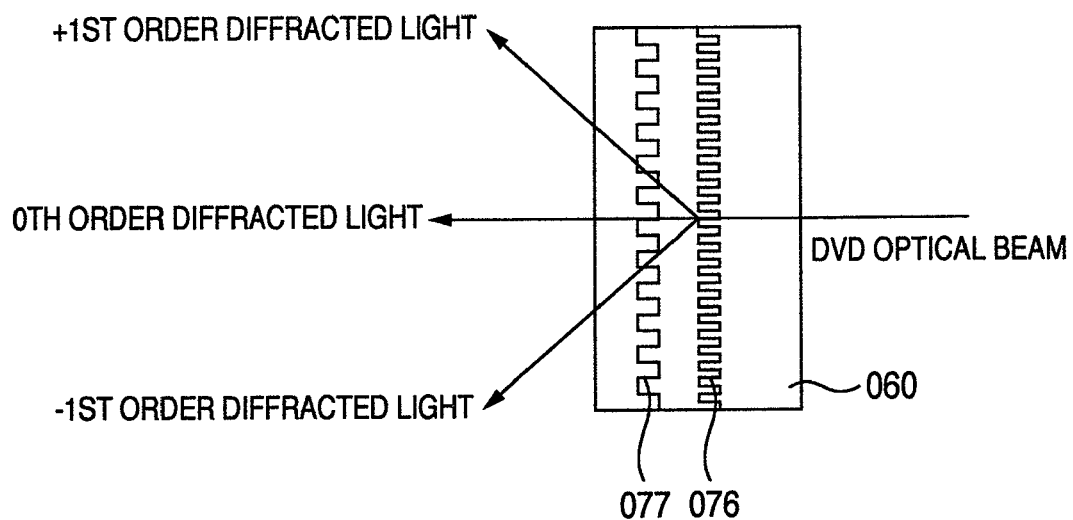
FIGS. 4A and 4B are diagrams for explaining an ideal grating according to a third embodiment.
Figure 4B:
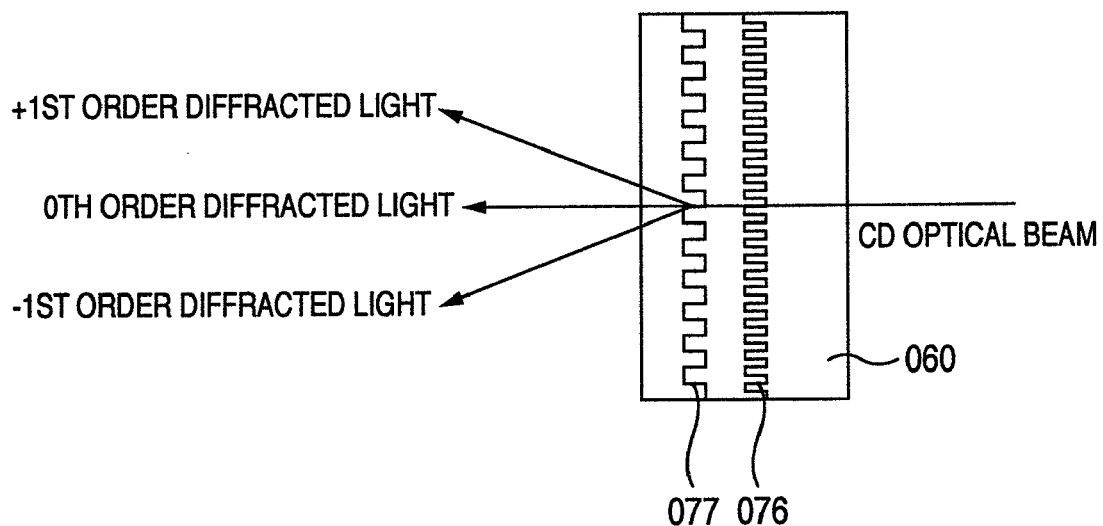

FIGS. 4A and 4B are schematic diagrams showing the optical beams diffracted by the grating 060. An ideal case is assumed in FIGS. 4A and 4B. FIG. 4A illustrates a case in which the DVD optical beam is incident, and FIG. 4B a case in which the CD optical beam is incident.

The DVD and the CD have different gratings most suitable for generating the tracking error signal. Therefore, the grating 060 is formed with two grating patterns including the DVD grating pattern 076 and the CD grating pattern 077 to perform the record operation of both DVD and CD.

First, FIG. 4A is explained. Once the DVD optical beam enters the grating 060, the 0th order diffracted light (transmitted without being diffracted) and the ±1st order diffracted light are generated in the DVD grating plane 076. In an ideal case, the three beams including the 0th order and the ±1st order optical beams into which the DVD optical beam is split by the DVD grating plane 076 are transmitted without being diffracted by the CD grating pattern 077. Therefore, the DVD optical beam that has entered the grating 060 leaves the grating 060 as three optical beams. Incidentally, the 0th order diffracted light corresponds to the main optical beam 010, and the ±1st order diffracted light to the sub-optical beams 011, 012.

Next, FIG. 4B is explained. The CD optical beam entering the grating 060 is transmitted without being diffracted in the ideal DVD grating plane 076. From the CD optical beam incident to the CD grating pattern 077, the 0th order diffracted light (transmitted without being diffracted) and the ±1st order diffracted light are generated. As a result, the CD optical beam incident to the grating 060 is emitted as three optical beams from the grating 060. In the CD optical system, the 0th order diffracted light corresponds to the main optical beam 013, and the ±1st order diffracted light to the sub-optical beams 014, 015.

Also, the CD grating pattern 077 has a larger grating pitch than the DVD grating pattern 076, and therefore, the ±1st order diffracted optical beam for CD has a smaller diffraction angle than the ±1st order diffracted optical beam for DVD.

The wavelength is selectable to prevent the DVD grating pattern from being diffracted with the wavelength (785 nm) of the CD optical beam, and the CD grating pattern from being diffracted with the wavelength (660 nm) of the DVD optical beam. This exclusive function (wavelength selectability) can be realized by increasing the groove depth as compared with the ordinary grating while at the same time displacing the duty factor of the grating interval of the grating pattern from 0.5.

Actually, however, the perfect wavelength selectability cannot be secured due to the fabrication error (variations), etc.

Figure 5A:
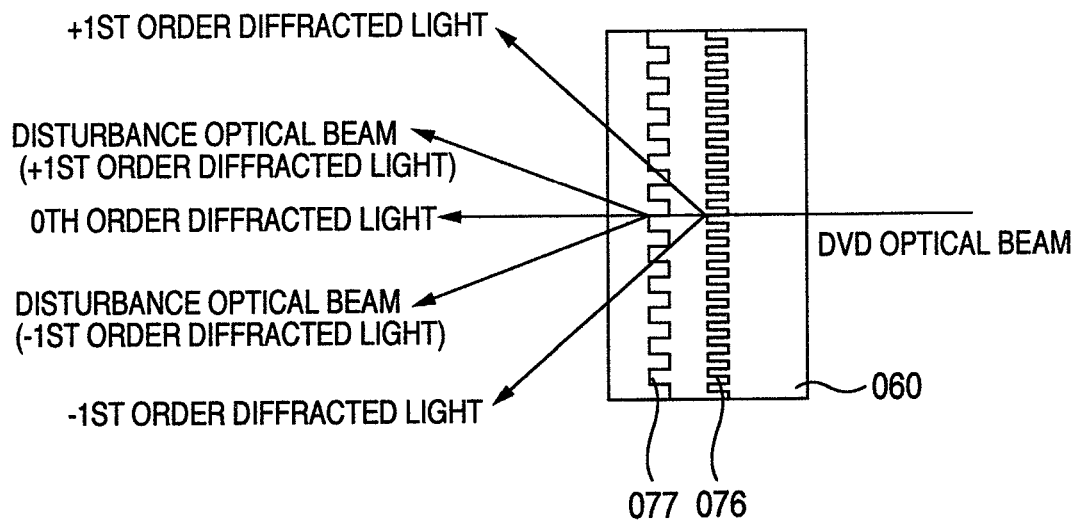
FIGS. 5A and 5B are diagrams for explaining the disturbance optical beams in the actual grating according to the third embodiment.
Figure 5B:
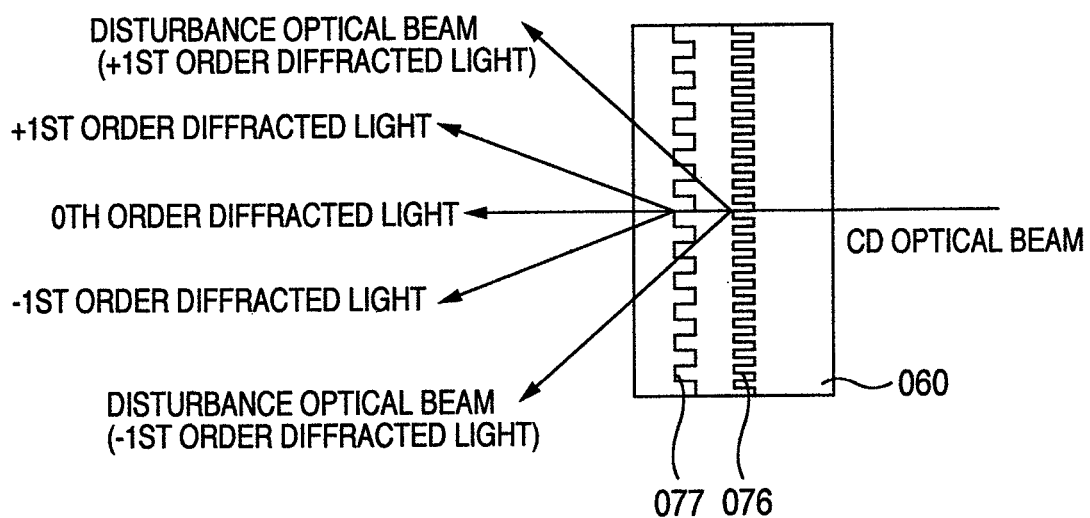

FIGS. 5A and 5B are schematic diagrams showing the optical beams diffracted by the grating 060, respectively, in an assumed actual case. FIG. 5A shows the diffraction of the incident DVD optical beam, and FIG. 5B the diffraction of the incident CD optical beam.

First, unlike in the ideal case shown in FIGS. 4A and 4B, the DVD optical beam incident to the grating 060 is diffracted by the CD grating pattern 077 as shown in FIG. 5A, and the unrequited disturbance optical beam is generated. The CD grating pattern 077 has a wider grating pitch than the DVD grating pattern 076, and therefore, the disturbance optical beam has a smaller angle of emission than the ±1st order diffracted optical beams.

Incidentally, the disturbance optical beams generated by the diffraction of the DVD optical beam in the CD grating pattern 077 correspond to the disturbance optical beams 020, 021.

In similar fashion, unlike in the ideal case shown in FIGS. 4A and 4B, the CD optical beam entering the grating 060 is diffracted by the DVD grating pattern 076 as shown in FIG. 5B, thereby generating the unrequired disturbance optical beams. The DVD grating pattern 076 is smaller in grating pitch than the CD grating pattern 077, and therefore, the disturbance optical beams have a larger emission angle than the ±1st order diffracted optical beams.

Incidentally, the disturbance optical beams generated by the diffraction of the CD optical beam in the DVD grating pattern 076 correspond to the disturbance optical beams 022, 023. Generally, the emission angle θ of the diffracted optical beams has the relation shown by Equation 8.

$$d \cdot \sin\theta = n\lambda \, (n=0,1,2\ldots) \tag{8}$$

where d is the grating pitch of the grating pattern, λ the wavelength and n the n-order diffraction. Specifically, the emission angle of the ±1st order diffracted optical beams is larger, the larger the wavelength, and smaller the larger the grating pitch d.

In the configuration wherein the same optical path has two grating planes or two gratings as described above, the generation of the disturbance optical beam cannot be avoided. In the detector described in FIG. 1, therefore, the detection areas are arranged in such a manner as to prevent the disturbance optical beams from contributing to the interference, as explained already.

Incidentally, unlike according to this embodiment in which the DVD grating pattern 076 is arranged near to the incidence surface of the grating 060 and the CD grating pattern 077 near to the exit surface, the DVD grating pattern may of course be alternatively arranged near to the exit surface of the grating without any problem.

Figure 6A:
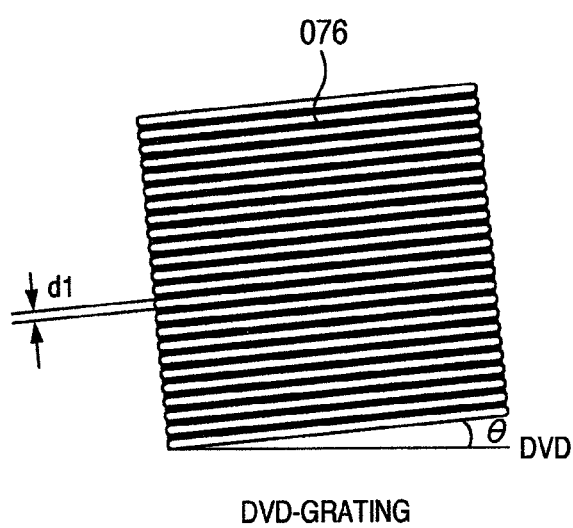
FIGS. 6A and 6B are diagrams for explaining the grating patterns according to the third embodiment.
Figure 6B:
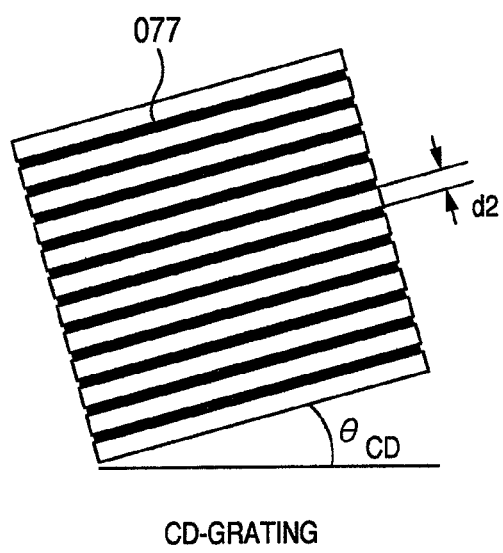

Next, the grating according to this embodiment is explained in detail. FIGS. 6A and 6B show the grating patterns of the grating 060. FIG. 6A shows the DVD grating pattern 076, and FIG. 6B the CD grating pattern 077. Incidentally, the DVD grating pattern corresponds to DVD±R/RW and the CD grating pattern to CD-R/RW.

The DVD grating pattern 076, as shown in FIG. 6A, has the grating pitch of d1 tilted at the pitch angle of $\theta_{DVD}$. The CD grating pattern 077, on the other hand, as shown in FIG. 6B, has the grating pitch of d2 tilted at the pitch angle of $\theta_{CD}$. The values d1 and d2 represent different pitches, and the feature of the invention lies in that the pitches d1 and d2 are changed in such a manner that the disturbance optical beam and the sub-optical beam may not be overlapped with each other on the detector 001. Especially, by setting the pitch d1 to a smaller value than d2, a small detection area can be arranged on the detector. This advantage is explained later.

The DVD grating pattern 076 and the CD grating pattern 077 are tilted at different angles ($\theta_{DVD}$, $\theta_{CD}$). This is because the optimum angle for the DPP is different between DVD and CD.

Specifically, in the grating according to this embodiment, two grating patterns having different grating pitches and pitch angles are attached to each other. By use of this grating, a highly accurate, stable tracking error signal by DPP can be detected free of interference by the disturbance optical beam in DVD and CD.

Figure 7A:
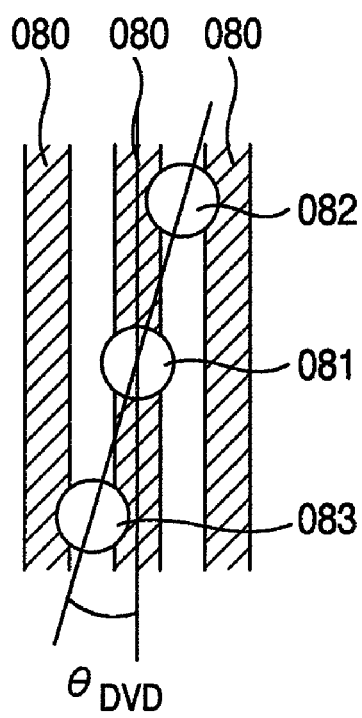
FIGS. 7A and 7B are diagrams showing the positions of spots on an optical disc according to the third embodiment.
Figure 7B:
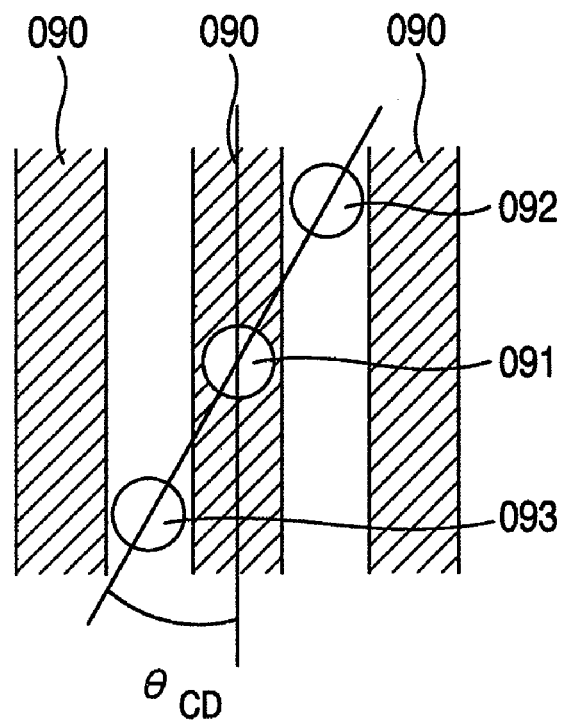

Next, the reason why DVD and CD have different pitch angles of the grating patterns for optimum DPP is explained with reference to FIGS. 7A and 7B. FIGS. 7A and 7B show the spot positions on the optical disc of the DVD-R and the CD-R, respectively. As shown in FIG. 7A, the DVD-R is formed with guide grooves 080, along which the data is recorded. The interval of the guide grooves 080 of the DVD-R is as small as 0.74 μm. The DPP is a technique, as described above, in which the sub-optical spots are arranged in spaced relation with the main optical spot on the optical disc by one half of the guide groove in the radial direction of the optical disc. In FIG. 7A, therefore, the sub-optical spots 082, 083 are arranged in spaced relation with the main optical spot 081 by one half of the guide groove in the radial direction of the optical disc (horizontally in FIG. 7A). As a result, in the DVD-R, the main optical spot 081 and the sub-optical spots 082, 083 are tilted from each other at an angle of $\theta_{DVD}$ with respect to the direction parallel to the guide grooves.

In the CD-R shown in FIG. 7B, on the other hand, the interval of the guide grooves 090 is as large as 1.6 μm as compared with the DVD-R. For carrying out DPP, therefore, the sub-optical spots 092, 093 are required to be arranged in spaced relation with the main optical spot 091 by one half of the guide groove in the radial direction of the optical disc (horizontally in FIG. 7B) as shown in FIG. 7B. In the CD-R, therefore, the main optical spot 091 and the sub-optical spots 092, 093 are tilted with each other at an angle of $\theta_{CD}$ different from $\theta_{DVD}$ with respect to the direction parallel to the guide grooves. Specifically, the difference in the guide groove interval between DVD-R and CD-R leads to different optimum angles of the three beams for DPP on the disc between DVD-R and CD-R. For this reason, two grating patterns are required for realizing the record operation of DVD-R and CD-R with the optical pickup having the two-wavelength multilaser.

Fourth Embodiment

In a fourth embodiment, a grating is explained which is mounted on the optical pickup having the two-wavelength multilaser applicable to the super-MULTI optical drive. The novel feature of the fourth embodiment lies in the provision of a DVD grating pattern 099 different from the DVD grating pattern 076 of the third embodiment, whereby an optical pickup having a super-MULTI optical drive can be realized.

The DVD has a plurality of standards for DVD-R/RW, DVD-RAM and DVD-ROM. The super-MULTI optical drive is defined as an optical drive meeting all of these standards for DVD and CD. Especially, the DVD-R/RW and DVD-RAM are discs having different standards for the guide groove interval. In DPP, as described above, the main optical beam and the sub-optical beams are required to be radiated at predetermined positions on the disc, and therefore, the positions at which the main optical beam and the sub-optical beams are radiated are varied with the guide groove interval. This poses the problem that the DPP is not applicable to the discs having different standards for the guide groove interval.

FIGS. 8A and 8B show the patterns of the grating 060. FIG. 8A shows the DVD grating pattern 099, and FIG. 8B the CD grating pattern 077. The CD grating pattern is identical with the grating pattern of the third embodiment, and therefore, not explained again.

The DVD grating pattern 099, unlike the DVD grating pattern 076 having the grating pitch d1 as shown in FIG. 6A, has no pitch angle. Thus, the DVD grating pattern and the CD grating pattern are tilted relatively to each other at an angle of $\theta_{CD}$. The pitches d1 and d2 are different from each other, and the feature of this embodiment resides in that the pitches d1 and d2 are set in such a manner that the disturbance optical beams and the sub-optical beams are not overlapped with each other on the detector 001. Especially, by setting d1 to a value smaller than d2, the detection areas arranged on the detector can be effectively reduced, as described again later.

The DVD grating pattern 099 is divided into three areas A, B, C, each having the phases shifted by 90 degrees (The phase change with respect to the optical beam is shifted by about 90 degrees between areas A and C, and about 90 degrees between areas B and C. The areas A and B are arranged at the ends of the diffraction pattern 099, respectively, while the area C is interposed between areas A and B). By using this grating, the tracking error signal can be detected by the phase difference DPP. In other words, the tracking error signal can be detected from both DVD-R/RW and DVD-RAM. By attaching the DVD grating pattern 099 and a linear grating tilted by the grating angle $\theta_{CD}$ to each other, therefore, the super-MULTI optical pickup can be realized.

Fifth Embodiment

A fifth embodiment is explained with reference to an optical pickup having the two-wavelength multilaser adapted for the super-MULTI optical drive.

Figure 9:
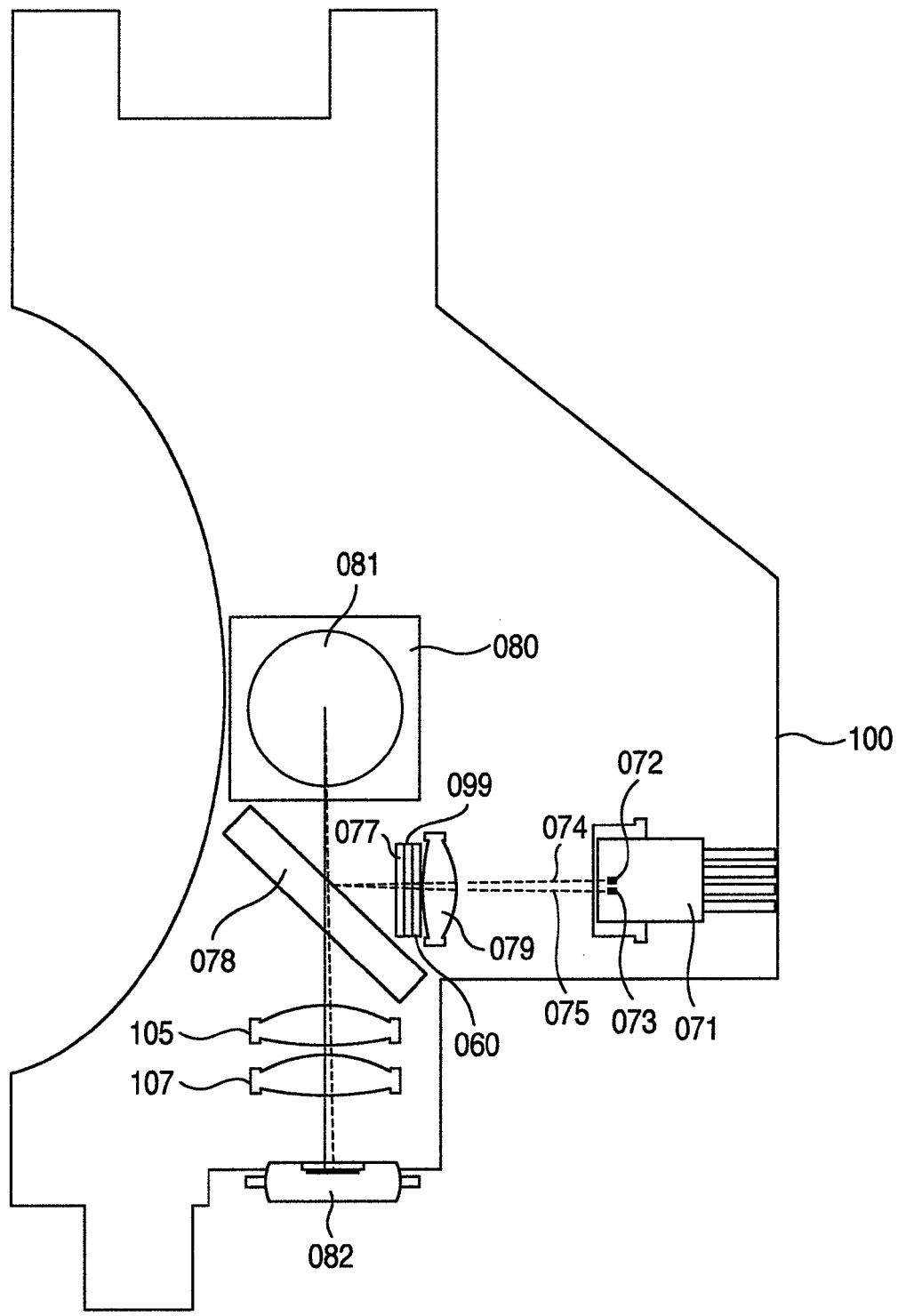
FIG. 9 is a diagram showing a general configuration of an optical pickup according to a fifth embodiment.

FIG. 9 is a diagram showing the optical system configuration of the optical pickup 100. The component parts having the same function as those of the optical system according to the second embodiment are designated by the same reference numerals, respectively.

Like in the second embodiment, the two-wavelength multilaser 071 is a laser light source including two laser chips, i.e. a DVD laser chip 072 for emitting the optical beam having the wavelength of about 660 nm for DVD and a CD laser chip 073 for emitting the optical beam having the wavelength of about 785 nm for CD.

First, the DVD optical system is explained. The DVD optical beam is emitted as divergent light from the DVD laser chip 072 built in the two-wavelength multilaser 071. In FIG. 9, the dotted line 074 indicates the optical path of the DVD optical beam. The DVD optical beam emitted from the DVD laser chip 072 enters the collimating lens 079 and converted into a substantially parallel optical beam. Then, the optical beam enters the grating 060. The grating 060 includes a DVD grating pattern 099 capable of generating the optimum tracking error signal by the phase difference DPP and a CD grating pattern 077 capable of generating the tracking error signal by DPP in CD.

The DVD optical beam entering the grating 060, therefore, is split into three optical beams most suitable for the phase difference DPP method by the DVD grating pattern 099. The DVD optical beam passed through the DVD grating pattern 099 is passed also through the CD grating pattern 077. Ideally, the CD grating patter 077 is designed to transmit 100% of the DVD optical beam. Actually, however, a slight amount of the disturbance optical beam is generated.

The DVD optical beam passed through the CD grating pattern 077 is reflected on the beam splitter 078 and the reflection mirror 080 in the direction z in FIG. 9 (the direction perpendicular to the page), and through the objective lens 081 mounted on an actuator (not shown), focused on the optical disc (not shown).

The DVD optical beam is reflected on the optical disc, and reaches the detector 082 through the objective lens 081, the reflection mirror 080, the beam splitter 078, the detection lens 105 and the detection lens 107. The DVD optical beam is subjected to a predetermined astigmatism when passing through the beam splitter 078 and used for generating the focusing error according to the differential astigmatic detection method. The detection lens 105 and the detection lens 107 have the function of rotating the astigmatism in a predetermined direction while at the same time determining the size of the optical spot on the detector 082.

By using the two detection lenses, the interval between the beam splitter 078 and the detector 082 can be effectively reduced.

The DVD optical beam led to the detector 082 is used for the detection of the information signal recorded on the detector and the detection of the position control signals for the optical spots focused on the detector such as the tracking error signal and the focusing error signal.

Next, the CD optical system is explained. The CD optical beam is emitted as a divergent light from the CD laser chip 073 built in the two-wavelength multilaser 071. In FIG. 9, the dotted line 075 designates the optical path of the CD optical beam. The CD optical beam emitted from the CD laser chip 073 enters the collimating lens 079 and is converted into a substantially parallel optical beam. As compared with the DVD optical beam, the CD optical beam has the emission angle tilted. This is by reason of the fact that the DVD laser chip 072 and the CD laser chip are arranged at the distance of 110 μm from each other in the direction y in FIG. 9. As a result, assuming that the DVD optical beam enters the center of the objective lens 081 with the optical axis thereof perpendicular to the particular center, the center of the CD optical beam is tilted.

The optical beam passed through the collimating lens 079 enters the grating 060. The CD optical beam entering the grating 060 is passed through the DVD grating pattern 099. Ideally, the DVD grating pattern 090 is designed to transmit 100% of the CD optical beam. Actually, however, a slight amount of the disturbance optical beam is generated. The CD optical beam passed through the DVD grating pattern 099 enters the CD grating pattern 077. The CD optical beam entering the CD grating pattern 077 is split into three optical beams most suitable for DPP of the CD by the CD grating pattern 077.

The CD optical beam that has passed through the CD grating pattern 077 is reflected on the beam splitter 078 and the reflection mirror 080 at an angle z in FIG. 9 (the direction perpendicular to the page), and focused on the optical disc (not shown) by the objective lens 081 mounted on the actuator (not shown).

The CD optical beam is reflected on the optical disc and reaches the detector 082 through the objective lens 081, the reflection mirror 080, the beam splitter 078, the detection lens 105 and the detection lens 107. The CD optical beam is also subjected to a predetermined astigmatism when passing through the beam splitter 078, and used for generating the focusing error signal according to the differential astigmatic detection method. The detection lens 105 and the detection lens 107 have the function of rotating the astigmatism in a predetermined direction while at the same time determining the size of the light spots on the detector 082. Also, the use of the two detection lenses provides the function of reducing the interval between the beam splitter 078 and the detector 082, so that the CD optical beam led to the detector 082 is used for the detection of the information signal recorded on the optical disc and the detection of the position control signals for the light spots focused on the optical disc such as the tracking error signal and the focusing error signal.

As described above, in the optical pickup having the two-wavelength multilaser, the optical path of the DVD optical beam and that of the CD optical beam substantially coincide with each other, and therefore, the DVD optical beam is unavoidably passed through the CD grating pattern as well as the DVD grating pattern. The CD optical beam, on the other hand, is unavoidably passes through the DVD grating pattern as well as the CD grating pattern. As a result, the generation of the disturbance optical beam is unavoidable.

In the optical pickup according to this embodiment, as explained in the first embodiment, the interference of the disturbance optical beam with other optical beams on the detector is avoided, thereby making it possible to generate the tracking error signal and the focusing error signal highly accurate and stable like in the conventional optical pickup.

The optical pickup 100 according to the fifth embodiment is different from the optical pickup 070 of the second embodiment in the relative positions of the grating 060, the collimating lens 079 and the beam splitter 078. The optical beam emitted from the optical pickup 100 first enters the collimating lens 079, then the grating 060 and finally the beam splitter 079. Specifically, the grating 060 is arranged at a position where the optical beam emitted from the laser light source enters after being converted into a parallel optical beam by the collimating lens 079. The optical beam emitted from the laser light source enters the optical information recording medium after passing through the collimating lens 079, the grating 060, the beam splitter 078 and the objective lens 081 in that order. In this configuration, the grating 077 is arranged at a position after emission of the optical beam from the collimating lens 079, and therefore, entered by the substantially parallel optical beam. This indicates that the grating 077 is arranged at a position where the optical beam has the largest effective diameter.

The DVD grating pattern 099 is divided into three parts, and therefore, the problem is posed that upon occurrence of an error between the center of the optical beam and the central position of the grating, the amplitude of the tracking error signal is undesirably reduced.

Figure 10:
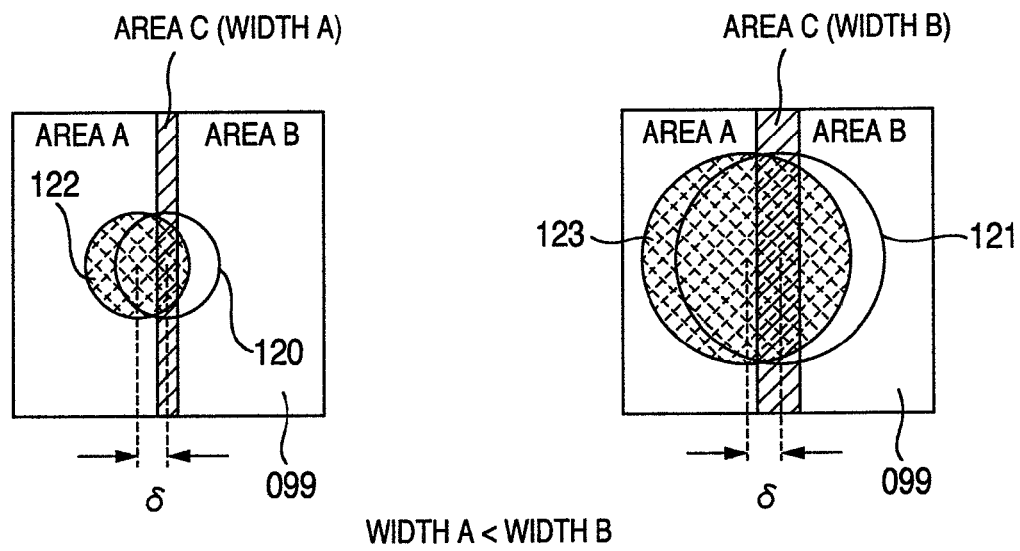
FIG. 10 is a diagram for explaining the relation between the effective diameter of the optical beam incident to the grating and the part error according to the fifth embodiment.

FIG. 10 shows the relation between the DVD grating pattern 099 and the optical beam entering the DVD grating pattern 099. In FIG. 10, (a) shows a case in which the effective diameter of the incident optical beam is small, and (b) a case where it is large. The width of the area C of the DVD grating pattern 099 is set at a value representing a predetermined ratio of the effective diameter thereof. In the case of (a), the optical beam 120 small in effective diameter enters the DVD grating pattern 099, and therefore, the width A of the area C is small. In the case of (b), on the other hand, the optical beam 121 larger in effective diameter than the optical beam 120 enters the DVD grating pattern 099, and therefore, the width B of the area C is larger than the width A.

At the time of assembling the optical pickup, the mounting error between the left and right sides of the DVD grating pattern in FIG. 10 is unavoidable, and a position error occurs between the center of the optical beam and the center of the DVD grating pattern. This error reduces the TES signal amplitude. Upon occurrence of the mounting error δ, the center of the optical beam and the center of the DVD grating pattern 099 are displaced from each other by δ. In the case of (a), the optical beam 120, if displaced by the mounting error δ, moves to the position of the optical beam 122. Similarly, in the case of (b) the optical beam 121, if displaced by the mounting error δ, is moved to the position of the optical beam 123. Upon occurrence of the same mounting error δ as shown in FIG. 10, the displacement between the area C and the optical beam 122 appears large due to the small effective diameter of the optical beam 122. As for the optical beam 123, on the other hand, the displacement with the area C appears small due to the large effective diameter thereof. With the increase in the effective diameter, therefore, the mounting error of a part has a lesser effect. In the case where the grating 077 is arranged at a position after emission from the collimating lens 079 as shown in FIG. 9, therefore, an increase in the effective diameter of the optical beam entering the grating 077 advantageously reduces the effect of the part mounting error.

Incidentally, the arrangement of the grating 077 at a position after emission from the collimating lens 079 as in the fifth embodiment can maximize the effective diameter of the optical beam incident to the grating 077 and therefore can minimize the effect of the part mounting error. In view of the fact that an increased effective diameter of the optical beam entering the grating 077 reduces the effect of the part mounting error, the grating 077 may be arranged between the collimating lens 079 and the two-wavelength multilaser 071. In this case, the nearer the grating 077 to the collimating lens 079, the smaller the effect of the part mounting error.

The fifth embodiment, in which the optical pickup adapted for the optical drive capable of the record and reproduce operation of DVD and CD is described, is of course applicable also to the CD and the optical pickup adapted for the next-generation high-density optical drive (BD and HD-DVD) using the blue semiconductor laser.

In the information recording and reproducing apparatus using the ordinary optical pickup, the light quantity of the optical beam radiated on the optical disc is required to be controlled to a constant level to assure the stable recording and reproducing process. Thus, the optical pickup includes therein a means (generally called the front monitor) for detecting the light quantity of the optical beam emitted from the laser light source, and by feeding back the detected light quantity to the laser light source, the light quantity of the optical beam radiated on the optical disc is accurately controlled. This configuration, however, is not directly related to the present embodiment and not described again. Nevertheless, this embodiment is applicable also to an optical pickup having the front monitor with equal effect.

Also, according to this embodiment, the DVD grating pattern and the CD grating pattern are formed in a single grating. Nevertheless, two gratings including the DVD grating and the CD grating can be formed without any problem.

Sixth Embodiment

Figure 11:
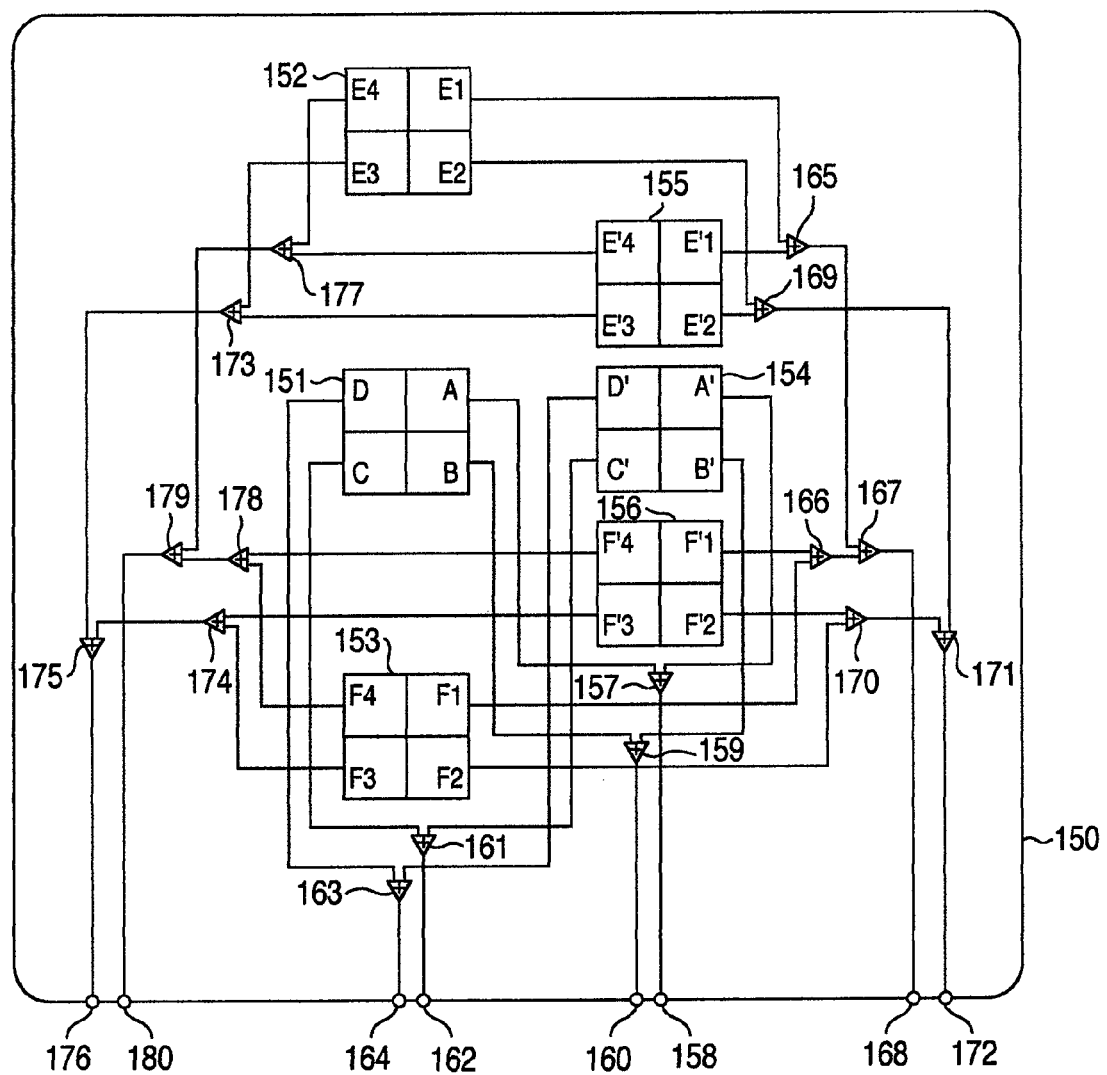
FIG. 11 is a diagram showing the internal connections of the detector according to a sixth embodiment.

A signal output of the detector according to a sixth embodiment is explained. FIG. 11 shows the detection patterns and the internal connections of the detector 150.

The detector 150 has six detection areas 151, 152, 153, 154, 155, 156. Each detection area is divided into four parts. The detection area 151 has detection surfaces A, B, C, D, the detection area 152 detection surfaces E1, E2, E3, E4, the detection area 153 detection surfaces F1, F2, F3, F4, the detection area 155 detection surfaces A', B', C', D', the detection area 156 detection surfaces E'1, E'2, E'3, E'4, and the detection area 157 detection surfaces F'1, F'2, F'3, F'4. In the case where all the signals are output externally from the detection surfaces of these detection areas, 24 output pins would be required. The feature of this embodiment lies in that the output pins are reduced to eight in number by calculating the output signal in the detector 150. The calculation for reducing the number of the output pins is explained below.

The detection surfaces A and A' are added to each other by an adder circuit 157 arranged in the detector 150 so that a signal (A+A') is output from an output pin 158.

The detection surfaces B and B' are added to each other by an adder circuit 159 arranged in the detector 150 so that a signal (B+B') is output from an output pin 160.

The detection surfaces C and C' are added to each other by an adder circuit 161 arranged in the detector 150 so that a signal (C+C') is output from an output pin 162.

The detection surfaces D and D' are added to each other by an adder circuit 163 arranged in the detector 150 so that a signal (D+D') is output from an output pin 164.

The detection surfaces E1 and E'1 are added to each other by an adder circuit 165 arranged in the detector 150, and the detection surfaces F1 and F'1 are added to each other by an adder circuit 166 arranged in the detector 150. Further, the signals output from the adder circuits 165 and 166 are added to each other by an adder circuit 167 arranged in the detector 150. In this way, a signal (E1+E'1+F1+F'1) is output from an output pin 168.

The detection surfaces E2 and E'2 are added to each other by an adder circuit 169 arranged in the detector 150, and the detection surfaces F2 and F'2 are added to each other by an adder circuit 170 arranged in the detector 150. Further, the signals output from the adder circuits 169 and 170 are added to each other by an adder circuit 171 arranged in the detector 150. In this way, a signal (E2+E'2+F2+F'2) is output from an output pin 172.

The detection surfaces E3 and E'3 are added to each other by an adder circuit 173 arranged in the detector 150, and the detection surfaces F3 and F'3 are added to each other by an adder circuit 174 arranged in the detector 150. Further, the signals output from the adder circuits 173 and 174 are added to each other by an adder circuit 175 arranged in the detector 150. In this way, a signal (E3+E'3+F3+F'3) is output from an output pin 176.

The detection surfaces E4 and E'4 are added to each other by an adder circuit 177 arranged in the detector 150, and the detection surfaces F4 and F'4 are added to each other by an adder circuit 178 arranged in the detector 150. Further, the signals output from the adder circuits 177 and 178 are added to each other by an adder circuit 179 arranged in the detector 150. In this way, a signal (E4+E'4+F4+F'4) is output from an output pin 180.

Each detection signal can be detected by Equations 9 to 14 below. In Equations 9 to 14, the output pins 180, etc. are expressed as P180, etc.

$$\text{DVD total main light quantity} = P158 + P160 + P162 + P164 = A+B+C+D+A'+B'+C'+D' = A+B+C+D \quad (9)$$

In this case, the CD laser light source is not turned on for the record/reproduce operation of the DVD, and therefore, the detection signals from the detection areas 154, 155, 156 are 0.

$$\text{CD total main light quantity} = P158 + P160 + P162 + P164 = A+B+C+D+A'+B'+C'+D' = A'+B'+C'+D' \quad (10)$$

In this case, the DVD laser light source is not turned on for the record/reproduce operation of the CD, and therefore, the detection signals from the detection areas 151, 152, 153 are 0.

$$\text{DVD focusing error signal} = [(P158+P162)-(P160+P164)] + k\times[(P168+P176)-(P172+P180)] = [(A+C)-(B+D)] + k\times\{[(E1+E3)-(E2+E4)]+[(F1+F3)-(F2+F4)]\} + [(A'+C')-(B'+D')] + k'\times\{[(E'1+E'3)-(E'2+E'4)]+[(F'1+F'3)-(F'2+F'4)]\} = [(A+C)-(B+D)] + k\times\{[(E1+E3)-(E2+E4)]+[(F1+F3)-(F2+F4)]\} \quad (11)$$

In this case, the CD laser light source is not turned on for the record/reproduce operation of the DVD, and therefore, the detection signals from the detection areas 154, 155, 156 are 0.

$$\text{CD focusing error signal} = [(P158+P162)-(P160+P164)] + k\times[(P168+P176)-(P172+P180)] = [(A+C)-(B+D)] + k\times\{[(E1+E3)-(E2+E4)]+[(F1+F3)-(F2+F4)]\} + [(A'+C')-(B'+D')] + k'\times\{[(E'1+E'3)-(E'2+E'4)]+[(F'1+F'3)-(F'2+F'4)]\} = [(A'+C')-(B'+D')] + k'\times\{[(E'1+E'3)-(E'2+E'4)]+[(F'1+F'3)-(F'2+F'4)]\} \quad (12)$$

In this case, the DVD laser light source is not turned on for the record/reproduce operation of the CD, and therefore, the detection signals from the detection areas 151, 152, 153 are 0.

$$\text{DVD tracking error signal} = [(P158+P164)-(P160+P162)] + k\times[(P168+P180)-(P172+P176)] = [(A+D)-(B+C)] + k\times\{[(E1+E4)-(E2+E3)]+[(F1+F4)-(F2+F3)]\} + [(A'+D')-(B'+C')] - k'\times\{[(E'1+E'4)-(E'2+E'3)]+[(F'1+F'4)-(F'2+F'3)]\}[(A+D)-(B+C)] - k\times\{[(E1+E4)-(E2+E3)]+[(F1+F4)-(F2+F3)]\} \quad (13)$$

$$\text{CD tracking error signal} = [(P158+P164)-(P160+P162)] + k\times[(P168+P180)-(P172+P176)] = [(A+D)-(B+C)] - k\times\{[(E1+E4)-(E2+E3)]+[(F1+F4)-(F2+F3)]\} + [(A'+D')-(B'+C')] - k'\times\{[(E'1+E'4)-(E'2+E'3)]+[(F'1+F'4)-(F'2+F'3)]\} = [(A'+D')-(B'+C')] - k'\times\{[(E'1+E'4)-(E'2+E'3)]+[(F'1+F'4)-(F'2+F'3)]\} \quad (14)$$

In this case, the DVD laser light source is not turned on for the record/reproduce operation of the CD, and therefore, the detection signals from the detection areas 151, 152, 153 are 0.

In the foregoing equations, k and k' are coefficients for correcting the light quantity ratio between the main optical beam and the sub-optical beam.

Seventh Embodiment

In the seventh embodiment, an optical drive 200 with the aforementioned optical pickup 070 mounted thereon is explained.

Figure 12:
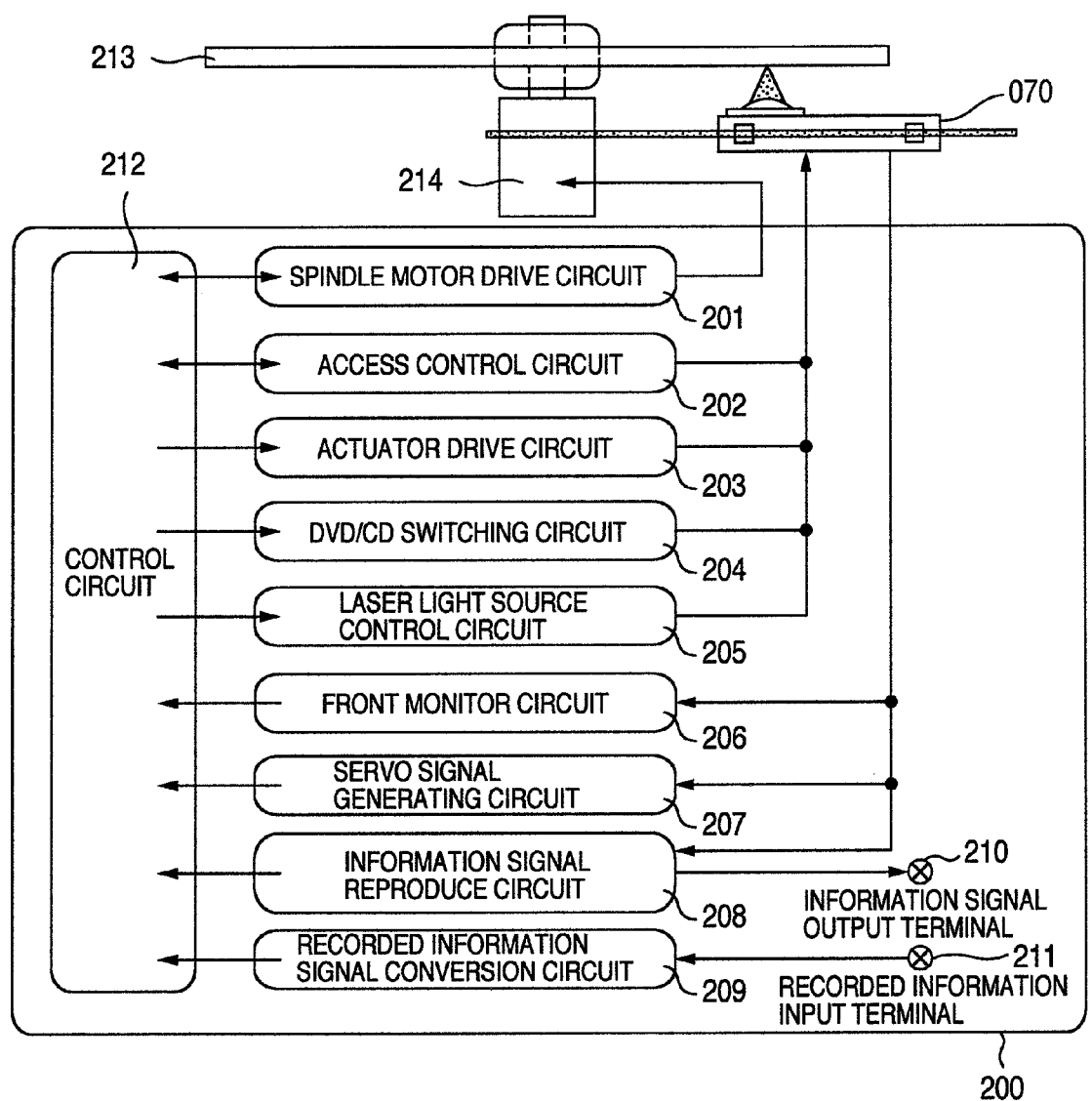
FIG. 12 is a diagram showing a general configuration of an optical drive according to a seventh embodiment.

FIG. 12 is a block diagram schematically showing an optical drive 200 for the record/reproduce operation with the optical pickup 070 mounted thereon. The signal detected from the optical pickup 070 is sent to a servo signal generating circuit 207, a front monitor circuit 206 and an information signal reproducing circuit 208 arranged in the optical drive 200. In the servo signal generating circuit 207, the focusing error signal and the tracking error signal suitable for each optical disc are generated from the detection signals. The servo signal thus generated is sent from the control circuit 212 to an actuator drive circuit 203 to drive an objective lens actuator in the optical pickup 070 as required thereby to control the position of the objective lens. In the front monitor circuit 206, a light quantity monitor signal for the laser light source is detected from the detection signal produced by the front monitor, and based on this monitor signal, the laser light source control circuit 205 is driven so that the light quantity on the optical disc 213 is accurately controlled. Also, in the information signal reproducing circuit 208, the information signal recorded in the optical disc 213 is reproduced from the detection signal, and output to an information signal output terminal 210.

The recording information, once input to the recording information input terminal 2111, is converted into a predetermined laser drive recording signal by a recording information signal conversion circuit 209. This laser drive recording signal is sent to a control circuit 212 to drive the laser light source control circuit 205. Thus, the light quantity of the laser light source is controlled, and the recording signal is recorded in the optical disc 213. Incidentally, the control circuit 212 is connected with an access control circuit 202 and a spindle motor drive circuit 201 for controlling the position in the direction of accessing the optical pickup 070 and controlling the rotation of a spindle motor 214 of the optical disc 213, respectively.

Incidentally, the control circuit 212 has the function of determining the type of the optical disc 213 which has been set, from the focusing error signal, etc. generated by the servo signal generating circuit 207. Thus, which detector, DVD or CD, is to be validated and which optical beam, DVD or CD, is to be emitted are determined thereby to drive a DVD/CD switching circuit 204.

Eighth Embodiment

In the eighth embodiment, an explanation is given about the reason why the detection area on the detector can be reduced by reducing the grating pitch d2 of the CD grating pattern 077 as compared with the grating pitch d1 of the DVD grating pattern 076.

Figure 13A:
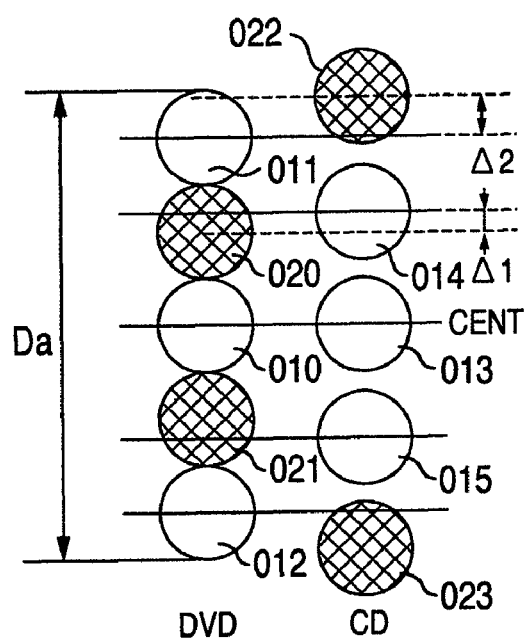
FIGS. 13A and 13B are diagrams for explaining the relative positions of the optical beams radiated on the detector according to an eighth embodiment.
Figure 13B:
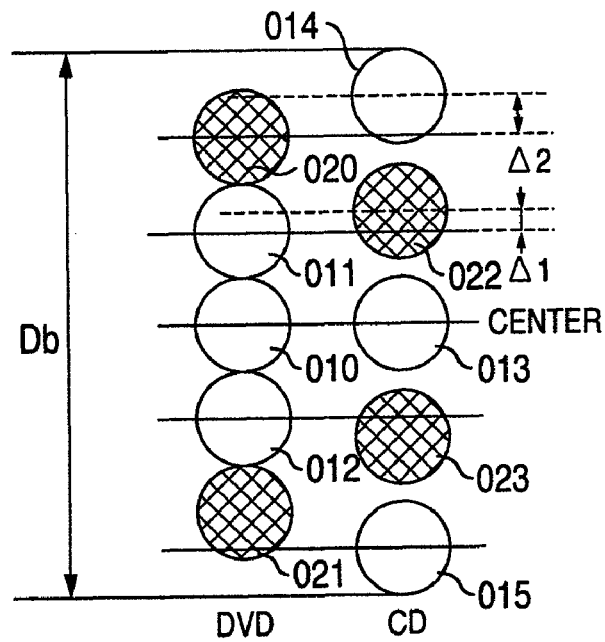
Figure 14:
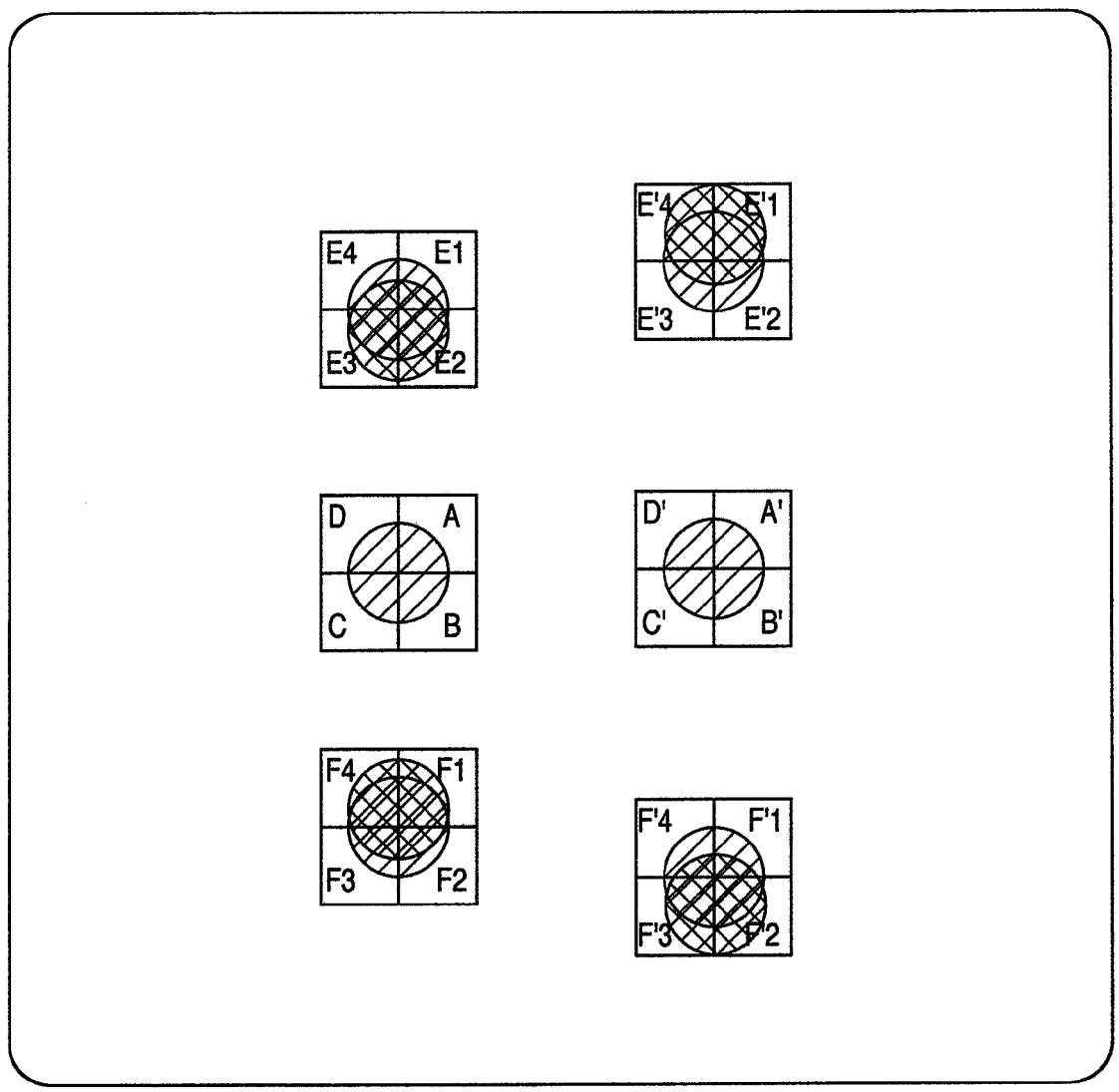
FIG. 14 is a diagram for explaining a conventional detector.

FIGS. 13A and 13B schematically show the positions at which the light spots are radiated on the detector, respectively. FIG. 13A shows a case in which d2 is smaller than d1, and FIG. 13B a case in which d2 is larger than d1.

FIGS. 13A and 13B are diagrams showing the manner in which the DVD main optical beam 010, the DVD sub-optical beams 011, 012, the CD main optical beam 013, the CD sub-optical beams 014 015 and the disturbance optical beams 020, 021, 023, 024 are radiated on the detector.

In the case of FIG. 13A, d2 is smaller than d1. Therefore, the CD sub-optical beams 014, 015, smaller in diffraction angle than the DVD sub-optical beams 011, 012, are radiated at positions nearer to the center of the optical beam. The diffraction angle holds the relation expressed by Equation 7.

Since CD involves a longer wavelength than DVD, the disturbance optical beams 020, 021 are radiated at positions nearer to the center than the CD sub-optical beams 014, 015. The interval between the disturbance optical beam 020 (021) and the CD sub-optical beam 014 (015) is assumed to be Δ1.

In similar fashion, the disturbance optical beams 022, 023 are radiated at positions farther from the center than the DVD sub-optical beams 011, 012. The interval between the disturbance optical beam 022 (023) and the DVD sub-optical beams 011 (012) is assumed to be Δ2. The smaller the grating pitch, the larger the diffraction angle. Therefore, Δ2 is larger than Δ1. In the case where the grating pitch d2 is smaller than d1 as in the case of FIG. 13A, the size of the whole light receiving area of the detector is determined by the DVD sub-optical beams 011, 012 and assumes the size Da as shown in FIG. 13.

In the case of FIG. 13B, d2 is larger than d1. Therefore, the CD sub-optical beams 014, 015, larger in diffraction angle than the DVD sub-optical beams 011, 012, are radiated at positions farther from the center of the optical beam.

In view of the fact that CD involves a longer wavelength than DVD, the disturbance optical beams 020, 021 are radiated at positions nearer to the center than the CD sub-optical beams 014, 015. Unlike in FIG. 13A, the interval between the disturbance optical beam 020 (021) and the CD sub-optical beams 014 (015) is Δ1.

In similar fashion, the disturbance optical beams 022, 023 are radiated at positions nearer to the center than the DVD sub-optical beams 011, 012. The interval between the disturbance optical beam 022 (023) and the DVD sub-optical beam 011 (012) is given as Δ1. The smaller the grating pitch, the larger the diffraction angle, and therefore, Δ2 is larger than Δ1 as in the case of FIG. 13A. In the case where the grating pitch d2 is larger than d1 as in the case of FIG. 13B, the size of the whole light receiving area of the detector is determined by the CD sub-optical beams 014, 015 and assumes the value Db as shown in FIG. 13B.

Comparison between FIGS. 13A and 13B shows that Da is shorter than Db. This is attributable to the difference in wavelength between DVD and CD. The size of the light receiving area of the detector can be reduced by reducing the grating pitch d1 of the DVD grating pattern as compared with the grating pitch d2 of the CD grating pattern as shown in FIG. 13A.

As described above, the optical pickup having mounted thereon the two-wavelength multilaser described in the embodiments of the invention can generate the tracking error signal and the focusing error signal high in accuracy and free of light quantity variations which otherwise might be caused by the interference.

Ninth Embodiment

Figure 15:
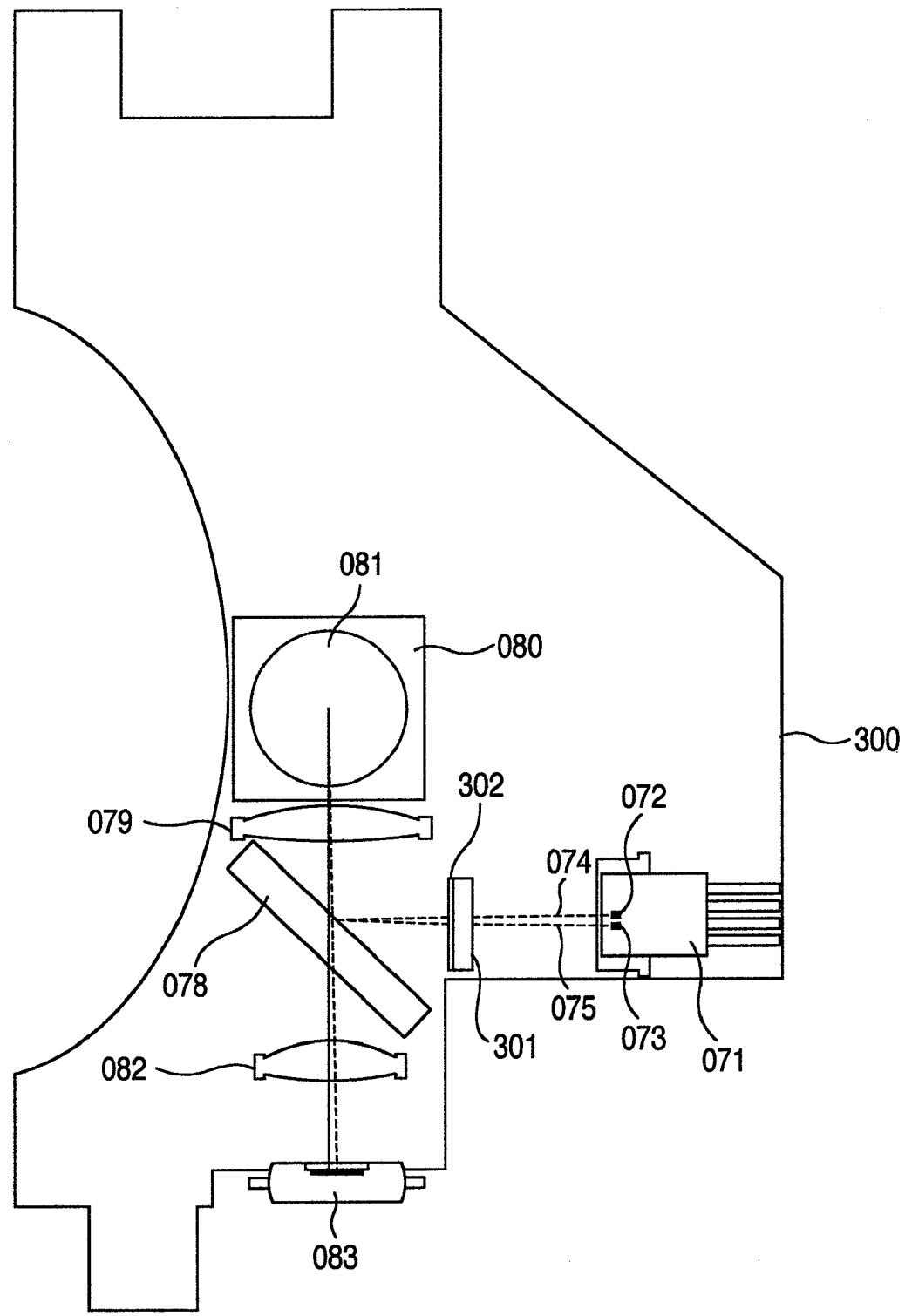
FIG. 15 is a diagram showing a general configuration of an optical pickup according to a ninth embodiment.

The ninth embodiment represents a modification of the optical pickup explained in the second embodiment. FIG. 15 is a diagram showing the configuration of the optical system of the optical pickup 300. The optical pickup 300 has mounted thereon a grating 301 different in configuration than the grating 060 of the optical pickup 070 according to the second embodiment.

The grating 301, like the grating 060, has the function of spitting the optical beam. The optical beams formed by splitting are used similarly to generate the tracking error signal for DPP. However, the grating 060, having two grating planes including the DVD grating pattern 076 and the CD grating pattern 077, is different from the grating 301 having only one grating plane constituting the DVD/CD-shared grating pattern 302.

The optical discs of various types are available. Generally, in the optical disc recording operation, a large quantity of light is radiated on the optical disc to change the composition of the area irradiated by the light. Also, the high-speed recording operation of the optical disc requires the radiation of a larger quantity of light on the optical disc. In recent years, a multilayer optical disc has been commercialized, thereby making it necessary to radiate a still larger quantity of light on the optical disc. Generally, the quantity of the light radiated on the optical disc is determined by the product of the quantity of the light emitted from the laser light source, the transmission efficiency of the optical parts interposed between the laser light source and the optical disc and the coupling efficiency of the objective lens. For this reason, the transmission efficiency of the optical parts is required to be increased as far as possible.

In the case where two grating planes have no wavelength selectability, the diffraction occurs in each of the two grating planes. Therefore, the main optical beam (the 0th order diffracted light contributing to the recording on the optical disc) is greatly reduced in light quantity, resulting in a small transmission efficiency. In other words, a sufficient quantity of light cannot be transmitted to the optical disc. With the two grating planes each having a wavelength selectability and the suppression of the generation of the disturbance optical beams, therefore, the transmission efficiency equivalent to that of the conventional optical pickup can be secured. For this reason, the third embodiment has been explained with reference to a case using the grating having a wavelength selectability. Since an element having the wavelength selectability has two grating planes, however, the production process of the grating is lengthened and the cost thereof is difficult to reduce. The single grating plane like in the grating 301 of the optical pickup 300 can implement a simple grating high in transmission efficiency and low in cost in the prior art. The DPP cannot of course be realized for both DVD and CD if the element is mounted without any idea. The grating pattern 302 shared by DVD and CD (hereinafter referred to as the DVD/CD-shared grating pattern 302) of the grating 301 is explained below.

Figure 16A:
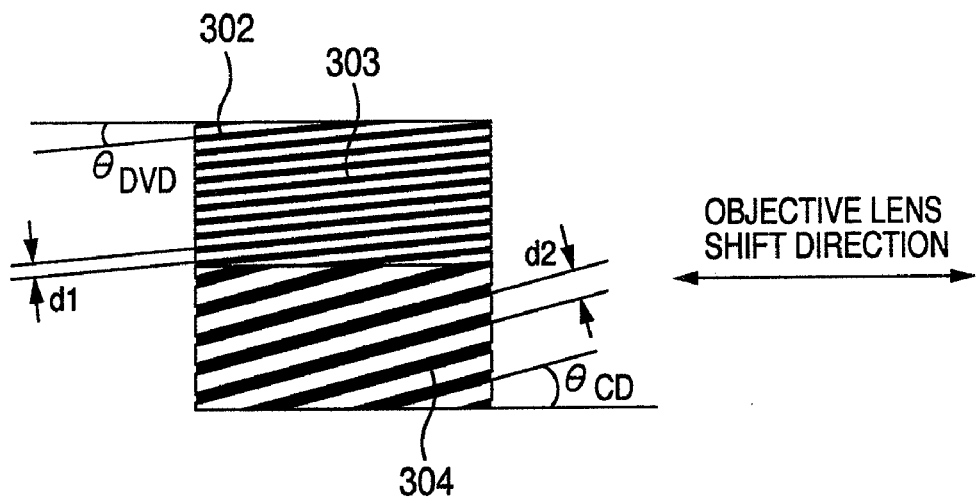
FIGS. 16A and 16B are diagrams schematically showing the grating pattern and the optical beams split by the grating according to the ninth embodiment.
Figure 16B:
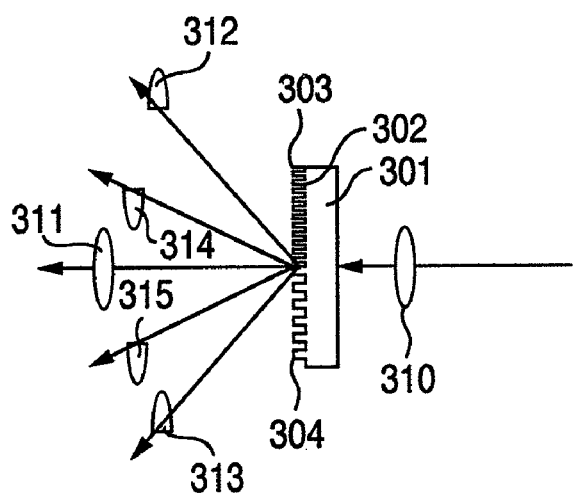

FIGS. 16A and 16B are diagrams for explaining the DVD/CD-shared grating pattern 302. FIG. 16A is a schematic diagram showing the configuration of the DVD/CD-shared grating pattern 302, and FIG. 16B is a schematic diagram showing the optical beams obtained by the splitting of the optical beam incident to the DVD/CD-shared grating pattern 302.

First, with reference to FIG. 16A, the configuration of the DVD/CD-shared grating pattern 302 is explained. The DVD/CD-shared grating pattern 302 is divided into two areas, i.e. an optimum pattern 303 for DVD (hereinafter referred to as the DVD optimum pattern 303) and an optimum pattern 304 for CD (hereinafter referred to as the CD optimum pattern 304). The DVD optimum pattern 303 has the same grating pitch d1 as the DVD grating plane 076 and an angle $\theta_{DVD}$, while the CD optimum pattern 304 has the same grating pitch d2 as the CD grating plane 077 and an angle $\theta_{CD}$. Also, the boundary between the DVD optimum pattern 303 and the CD optimum pattern 304 preferably coincides with the direction in which the objective lens is shifted. By doing so, the tracking error signal (push-pull signal) can be generated. Also, the detection signal variation which otherwise might occur at the time of shifting the objective lens can be suppressed.

Next, the optical beam incident to the grating 301 and the optical beam exiting from the grating 301 are explained with reference to FIG. 16B. The center of the incident optical beam 310 is determined in such a manner as to coincide with the boundary between the DVD optimum pattern 303 and the CD optimum pattern 304. This is in order to maintain a satisfactory amplitude balance between the DVD tracking error signal and the CD tracking error signal. The incident optical beam 310 is split into an optical beam 311 constituting the 0th order diffracted light transmitted without diffraction, an optical beam 312 constituting the +1st order diffracted light and an optical beam 313 constituting the −1st order diffracted light diffracted by entering the DVD optimum pattern 303, and an optical beam 314 constituting the +1st order diffracted light and an optical beam 315 constituting the −1st order diffracted light diffracted by entering the CD optimum pattern 304. The optical beams 312, 313, 314, 315 are smaller than the optical beam 311 due to the fact that one grating plane has two patterns such as the DVD/CD-shared grating pattern 302. Incidentally, the optical beams 312, 313 split by the DVD optimum pattern 303 proceed in the directions at a larger angle than the optical beam 311 due to the narrow grating pitch d1 of the DVD optimum pattern 303.

Figure 17:
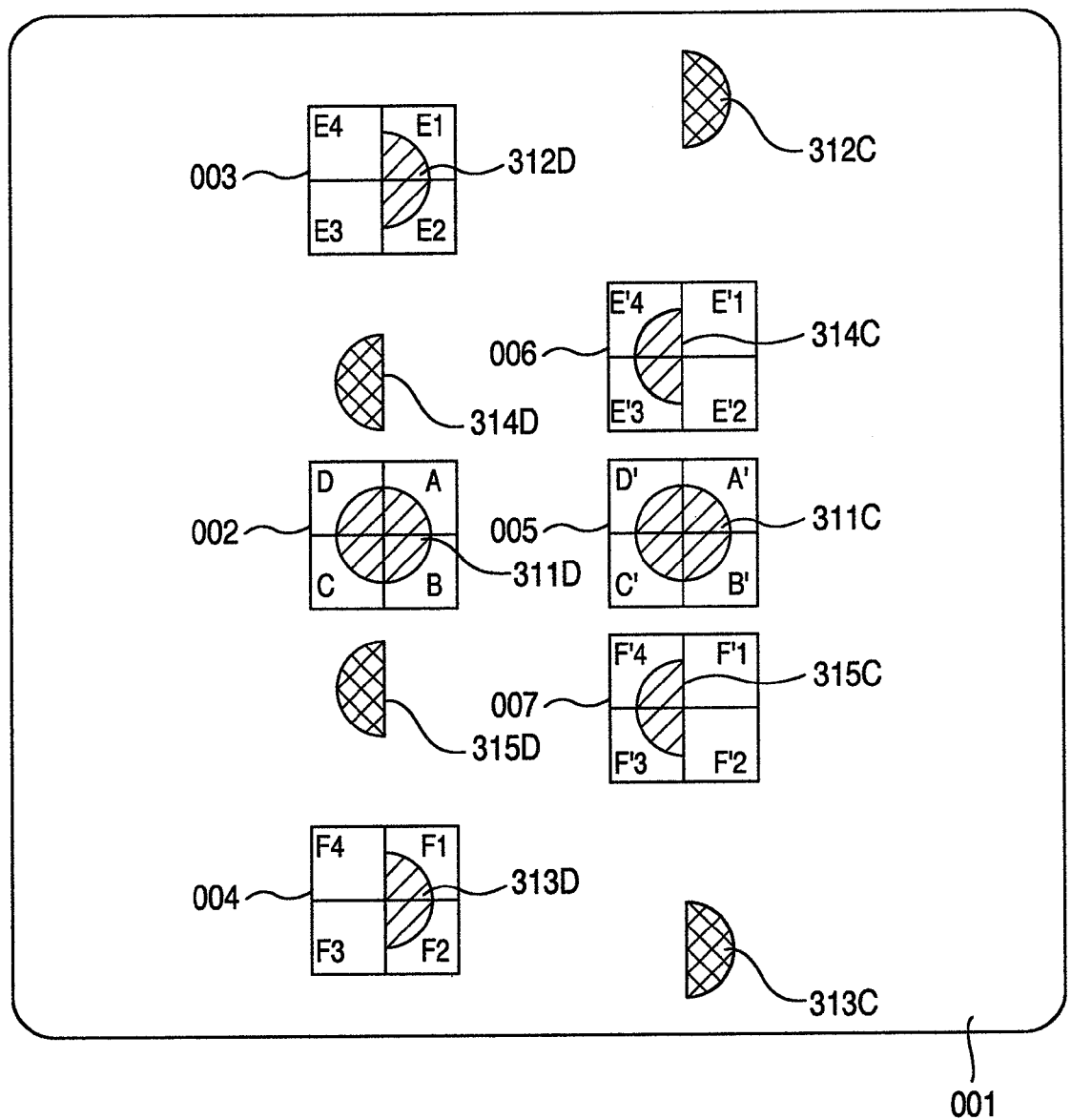
FIG. 17 is a diagram for explaining the relative positions of the optical beams radiated on the detector according to the ninth embodiment.

FIG. 17 schematically shows the optical beams radiated on the detector 001 in the optical pickup 300.

Upon entry into the grating 301, the DVD optical beam, as explained with reference to FIG. 16B, is split into a DVD main optical beam 311D (corresponding to the optical beam 311), DVD sub-optical beams 312D (corresponding to the optical beam 312) and 313D (corresponding to the optical beam 313), and DVD disturbance optical beams 314D (corresponding to the optical beam 314) and 315D (corresponding to the optical beam 315). At the same time, the DVD main optical beam 311D is radiated on the detection area 002, the DVD sub-optical beam 312D on the detection area 003 and the DVD sub-optical beam 313D on the detection area 004. In the process, the DVD disturbance optical beams 314D, 315D are prevented from being received by the detector.

Similarly, upon entry into the grating 301, the CD optical beam is split into a CD main optical beam 311C (corresponding to the optical beam 311), CD sub-optical beams 314C (corresponding to the optical beam 314) and 315C (corresponding to the optical beam 315), and CD disturbance optical beams 312C (corresponding to the optical beam 312) and 313C (corresponding to the optical beam 313). At the same time, the CD main optical beam 311C is radiated on the detection area 005, the CD sub-optical beam 314C on the detection area 006 and the CD sub-optical beam 315C on the detection area 007. In the process, the CD disturbance optical beams 312C, 313C are prevented from being received by the detector.

Take the DVD sub-optical beam 312D as an example. It is understood that the DVD sub-optical beam 312D is divided into the detection surfaces (E1+E4) and (E2+E3). To generate the tracking error signal (especially, the push-pull signal), the differential output of the detection surfaces (E1+E4) and (E2+E3) as shown by Equations 5 and 6 is required. Thus, the boundary between the DVD optimum pattern 303 and the CD optimum pattern 304 is rendered to coincide with the direction in which the objective lens is shifted to assure the division between the detection areas (E1+E4) and (E2+E3). The grating is divided vertically, while the sub-optical beam on the detector is horizontally divided in FIG. 17 due to the use of the astigmatism for detection of the focusing error signal.

As described above, the boundary between the DVD optimum pattern 303 and the CD optimum pattern 304 of the grating is rendered to coincide with the direction in which the objective lens is shifted, in order that the DVD sub-optical beams 312D, 313D and the CD sub-optical beams 314C, 315C can generate the tracking error signal (push-pull signal).

Also, the DVD sub-optical beam 312D and the CD sub-optical beam 314C are horizontally symmetric with each other in FIG. 17 in order that the center of the incident optical beam 310 may be coincident with the boundary between the DVD optimum pattern 303 and the CD optimum pattern 304. In the case where the center of the incident light 310 shifts toward the DVD optimum pattern 303, for example, the CD sub-optical beam 314C on the detector is reduced while the DVD sub-optical beam 312D increases. With the decrease in the size of the CD sub-optical beam 314C, for example, the amplitude of the CD tracking error signal is reduced on the one hand and the amplitude of the DVD tracking error signal is increased on the other hand. By the coincidence of the boundary between the DVD optimum pattern 303 and the CD optimum pattern 304, therefore, the DVD sub-optical beam 312D and the CD sub-optical beam 314C can be made horizontally symmetric in FIG. 17, thereby making it possible to assure a satisfactory amplitude balance between the DVD tracking error signal and the CD tracking error signal.

By making the grating with an idea as shown in FIG. 16A, the optimum DPP can be realized for both DVD and CD with a single grating plane. In the case where the grating shown in FIG. 16A is used, the detector as shown in FIG. 1 is of course required to be used in such a manner as to prevent the disturbance optical beams from being overlapped with the sub-optical beams on the detector.

Also, the DVD/CD-shared grating pattern as shown in FIG. 16A, having only one grating plane, can realize substantially the same transmission efficiency as the grating having two grating planes with the wavelength selectability.

Further, the single grating plane facilitates the production of the grating and reduces the cost.

Tenth Embodiment

Figure 18:
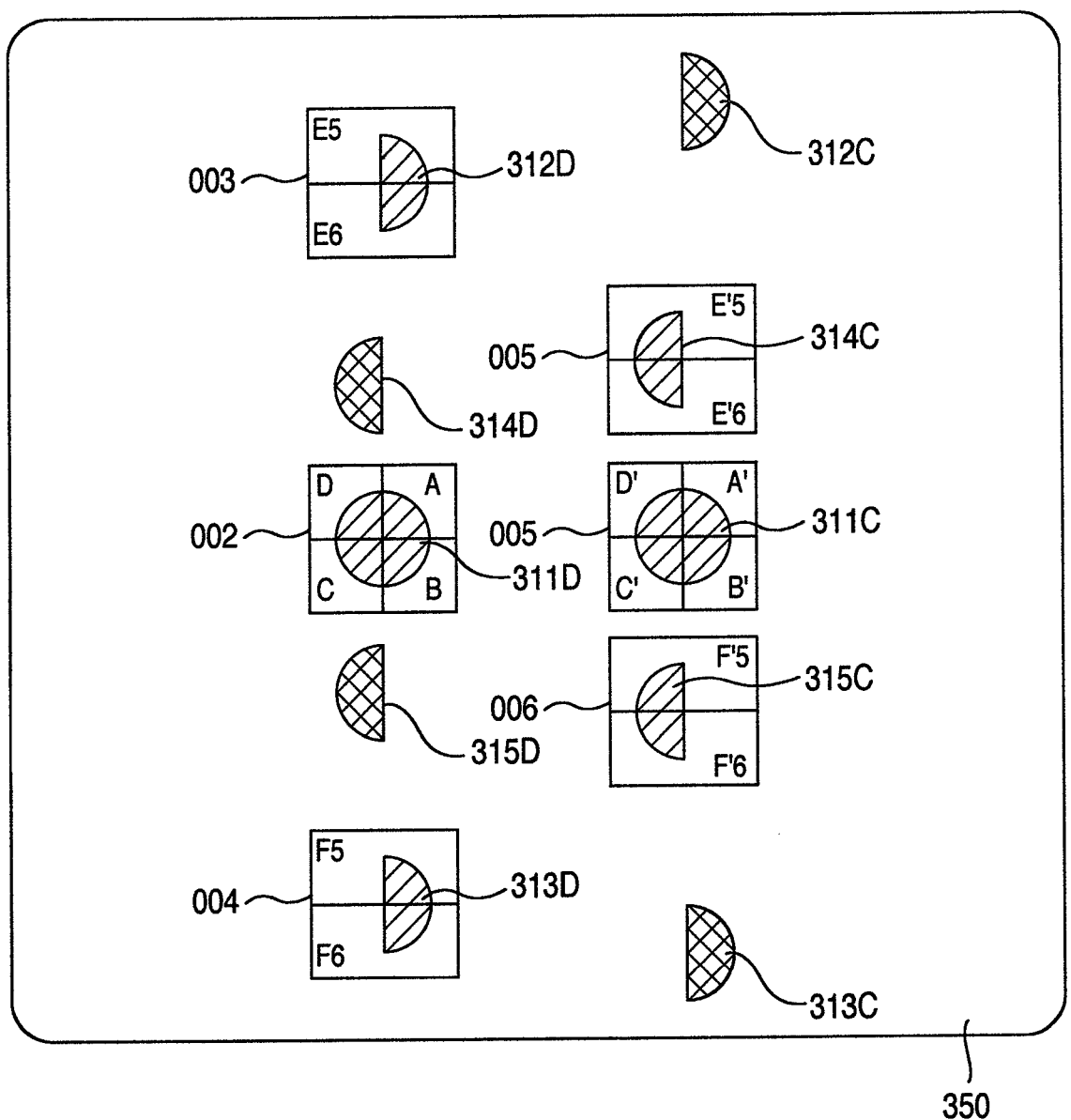
FIG. 18 is a diagram showing a general configuration of the detector according to a tenth embodiment.

The tenth embodiment represents a modification of the detector 001 described in the ninth embodiment. FIG. 18 is a diagram for explaining the detector 350 briefly. As compared with the detector 001, the detection surfaces of the detection areas 003, 004, 005, 006 are different.

Each detection area is divided into two parts. The detection area 002 has the detection surfaces E5, E6, the detection area 003 the detection surfaces F5, F6, the detection area 005 the detection surfaces E'5, E'6, and the detection area 006 the detection surfaces F'5, F'6. In the detection areas 003, 004, like in the ninth embodiment, the DVD sub-optical beam 312D is radiated on the detection area 003, while the DVD sub-optical beam 313D is radiated on the detection area 004. In the process, the DVD disturbance optical beams 314D, 315D are prevented from being received by the detector.

Also, with regard to the detection areas 005, 006, like in the ninth embodiment, the CD sub-optical beam 314C is radiated on the detection area 006, while the CD sub-optical beam 315C is radiated on the detection area 007. In the process, the CD disturbance optical beams 312C, 313C are prevented from being received by the detector.

In the optical pickup assuming that the DPP method is employed for generating the tracking error signal and the astigmatic detection method for generating the focusing error signal, the light-receiving area for receiving the sub-optical beam is used only for generating the tracking error signal (push-pull signal). Therefore, the light-receiving area is divided into two parts in the direction (vertical direction in the drawing) in which the tracking error signal (push-pull signal) can be detected from the sub-optical beam. For this reason, the detection surface of the detection areas 002, 003, 005, 006 is divided into only two parts. Unless some design is incorporated to prevent the disturbance optical beams from entering the detection areas as shown in FIG. 18, it is of course impossible to generate a stable tracking error signal and a stable focusing error signal. Incidentally, each detection signal is detected by Equations 15 to 18.

$$\text{DVD focusing error signal} = [(A+C)-(B+D)] \quad (15)$$

$$\text{CD focusing error signal} = [(A'+C')-(B'+D')] \quad (16)$$

$$\text{DVD tracking error signal} = [(A+D)-(B+C)]-k\times[(E5-E6)]+[(F5-F6)] \quad (17)$$

$$\text{CD tracking error signal} = [(A'+D')-(B'+C')]-k'\times[(E'5-E'6)]+[(F'5-F'6)] \quad (18)$$

Characters k, k' designate the coefficients for correcting the light quantity ratio between the main optical beam and the sub-optical beams. Unlike in the first embodiment, the light quantity of the sub-optical beam 312D is about one half of the light quantity of the sub-optical beam 003. According to this embodiment, therefore, the value k is different in magnitude from the value k in the first embodiment.

The use of the detector 350 shown in FIG. 18 can reduce the number of the parts into which each detection area of the detector 001 is divided, and therefore, simplifies the internal connection while at the same time realizing a detector easy to fabricate.

Depending on the corresponding optical disc, the required method of generating the focusing error signal and the tracking error signal is varied. As long as the detection areas are arranged in such a manner that the disturbance optical beams are prevented from entering the detection areas like in the detector 001, however, the detection areas can be divided any way as in the detector 350.

Eleventh Embodiment

The 11th embodiment represents a modification of the grating described in the ninth embodiment. FIG. 19 shows various modifications of the DVD/CD-shared grating pattern of the grating 301.

Figure 19A:
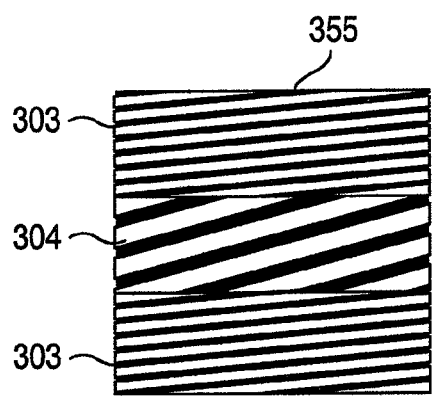
FIGS. 19A, 19B, 19C and 19D are diagrams for explaining the grating patterns according to an 11th embodiment.

FIG. 19A shows the DVD/CD-shared grating pattern 355. The DVD/CD-shared grating pattern 355, like the DVD/CD-shared grating pattern 302, is configured to have only one grating plane, but different in that the CD optimum pattern 304 is sandwiched by the DVD optimum patterns 303. Incidentally, the center of the CD optimum pattern 304 is preferably coincident with the center of the incident optical beam, and each boundary between the CD optimum pattern 304 and the DVD optimum patterns 303 preferably coincides with the direction in which the objective lens is shifted.

The use of the DVD/CD-shared grating pattern 355 can effectively suppress the leakage of the tracking error signal into the focusing error signal most effectively in the differential astigmatic detection method.

Specifically, the first grating pattern areas formed with the first grating patterns and the second grating pattern area formed with the second grating pattern are arranged in the same plane, and the second grating pattern area is interposed between the first grating pattern areas. In this way, the leakage of the tracking error signal into the focusing error signal can be effectively suppressed in the differential astigmatic detection method.

Figure 19B:
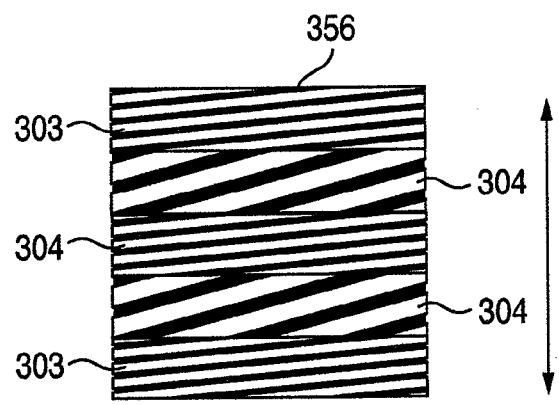

FIG. 19B shows a DVD/CD-shared grating pattern 356. The DVD/CD-shared grating pattern 356, though configured on a single grating plane similarly to the DVD/CD-shared grating pattern 302, is different in that the CD optimum patterns 304 and the DVD optimum patterns 303 are arranged alternately with each other. By arranging a plurality of patterns alternately on a single grating plane in this way, the center of the incident optical beam and the center of the grating are not required to be set in coincidence with the direction of the arrow. This is by reason of the fact that an increased number of areas makes it possible to average out the light quantity of the diffraction optical beams, and therefore, the need of adjustment is eliminated at the time of mounting the grating in the direction of arrow. In other words, the optical pickup can be advantageously assembled with ease. Incidentally, four or six divisions instead of five divisions along the direction of arrow in FIG. 19 is possible.

Figure 19C:
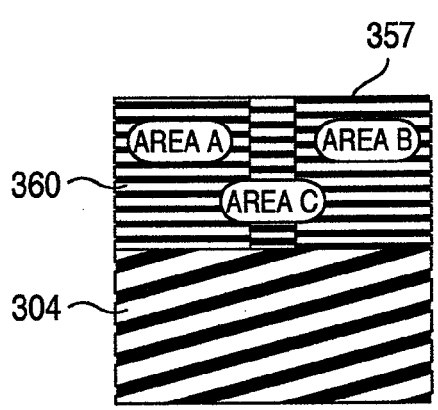

FIG. 19C illustrates a DVD/CD-shared grating pattern 357. The DVD/CD-shared grating pattern 357, like the DVD/CD-shared grating pattern 302, is configured of a single grating plane but has a different DVD optimum pattern 360 from the DVD optimum pattern 303. The DVD optimum pattern 360 is identical with the DVD grating pattern 099 and can be used with the phase difference DPP for generation of the DVD tracking error signal. In other words, the phase difference DPP can be used for detection of the tracking error signal, and therefore, the super-MULTI application is possible.

Figure 19D:
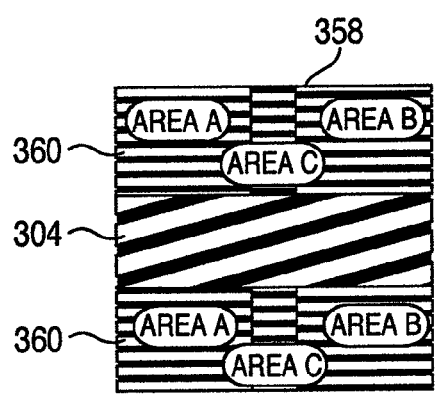

FIG. 19D illustrates a DVD/CD-shared grating pattern 358. The DVD/CD-shared grating pattern 358, also like the DVD/CD-shared grating pattern 357, is configured of a single grating plane, but different in that the CD optimum pattern 304 is sandwiched between the DVD optimum patterns 360. Incidentally, the center of the CD optimum pattern 304 is preferably set to the center of the incident optical beam and each boundary between the CD optimum pattern 304 and the DVD optimum patterns 360 is rendered to coincide with the direction in which the objective lens is shifted.

The use of the DVD/CD-shared grating pattern 358 can effectively suppress the leakage of the tracking error signal into the focusing error signal in the differential astigmatic detection method. Also, the provision of the DVD optimum pattern 360 makes it possible to use the phase difference DPP for detection of the tracking error signal. Thus, the super-MULTI application is made possible.

Specifically, the optical pickup carrying the grating of the DVD/CD-shared grating pattern 358 shown in FIG. 19D is adapted for the DVD/CD super-MULTI application, and the main optical beam can be efficiently radiated on the optical disc, while at the same time effectively suppressing the leakage in the differential astigmatic detection method.

Although FIG. 19 shows a case in which a single grating plane is divided into equal parts with the DVD optimum patterns 360 and the CD optimum patterns 304 arranged therein, the CD optimum patterns 304 and the DVD optimum patterns 360 may have any different widths. For example, the width of each CD optimum pattern 304 may be smaller than that of each DVD optimum pattern 360.

Incidentally, the grating pitch d1 of the grating is preferably set to about one half of the grating pitch d2. By doing so, the disturbance optical beam 020 on the detector is located at just the middle point between the detection areas 002 and 003, and the disturbance optical beam 021 at just the middle point between the detection areas 002 and 004. Even after taking the shift of the objective lens into consideration, therefore, a configuration can be advantageously formed in which the disturbance optical beams are most hard to enter the detection areas.

Twelfth Embodiment

The 12th embodiment represents a specific example of the optical pickup having the DVD/CD-shared grating patterns explained in the ninth to 11th embodiments.

Figure 20A:
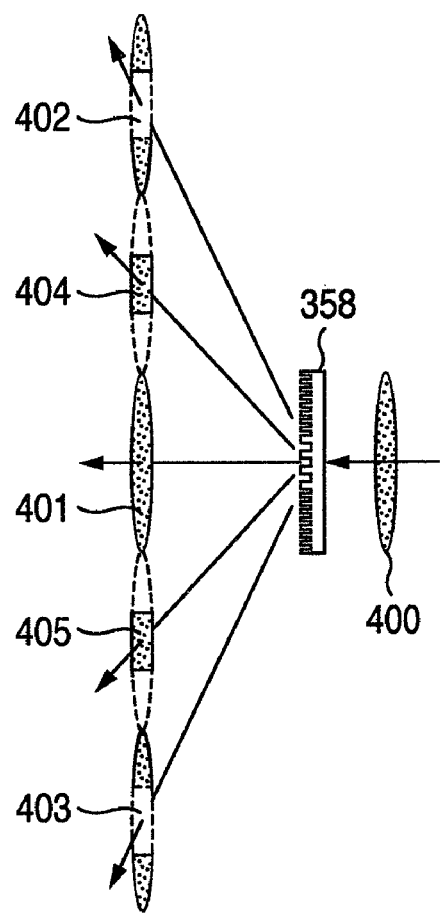
FIGS. 20A and 20B are diagrams schematically showing the grating pattern and the optical beams split by the grating according to a 12th embodiment.
Figure 20B:
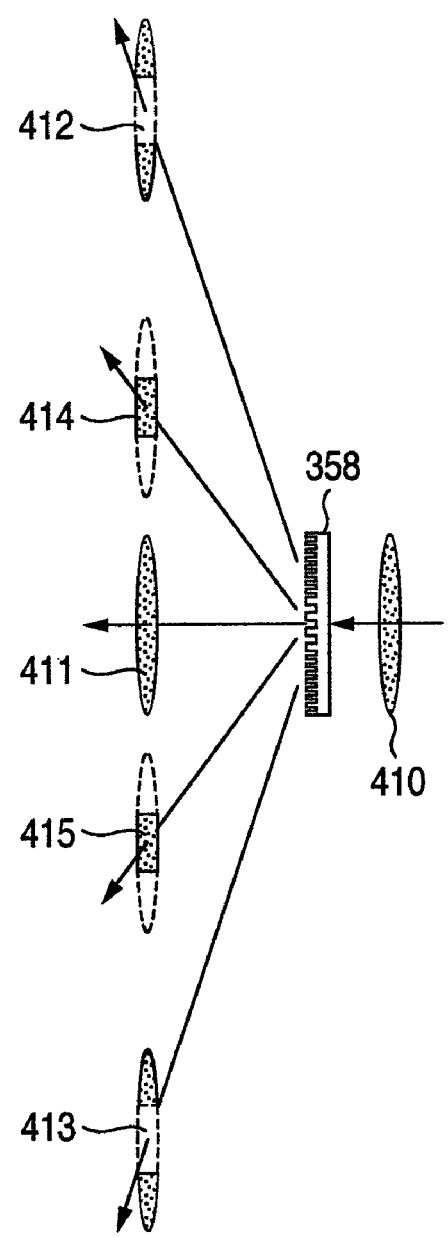

FIGS. 20A and 20B illustrate the manner in which the optical beam that has entered the DVD/CD-shared grating pattern 358 is split. FIG. 20A shows a case in which the CD optical beam is split, and FIG. 20B a case in which the DVD optical beam is split.

First, the case involving the CD shown in FIG. 20A is explained. The CD optical beam 400 incident to the DVD/CD-shared grating pattern 358 is split into a CD main optical beam 401 constituting the 0th order diffracted light transmitted without diffraction, a CD sub-optical beam 402 making up the +1st order diffracted light and a CD sub-optical beam 403 making up the −1st order diffracted light diffracted by entering the CD optimum pattern 304, and an optical beam 404 not required for CD (hereinafter referred to as the CD unrequired optical beam 404) making up the +1st order diffracted light and a CD unrequited optical beam 405 making up the −1st order diffracted light diffracted by entering the DVD optimum pattern 360.

The CD sub-optical beams 402, 403 constitute the optical beams formed only by the central portion of the DVD/CD-shared grating pattern 358 since the area of the CD optimum pattern 304 is located only at the central portion thereof. The CD unrequired optical beams 404, 405, on the other hand, lack the central portion since the area of the DVD optimum pattern 360 is located in the remaining portions of the DVD/CD-shared grating pattern 358 other than the CD optimum pattern 304.

Next, the case involving the DVD shown in FIG. 20B is explained. The DVD optical beam 410 that has entered the DVD/CD-shared grating pattern 358 is split into a DVD main optical beam 411 constituting the 0th order diffracted optical beam transmitted without diffraction, a DVD sub-optical beam 412 making up the +1st order diffracted light and a DVD sub-optical beam 413 making up the −1st order diffracted light diffracted by entering the DVD optimum pattern 360, and an optical beam 414 not required for DVD (hereinafter referred to as the DVD unrequited optical beam 414) constituting the +1st order diffracted light and the DVD unrequired optical beam 415 making up the −1st order diffracted light diffracted by entering the DVD optimum pattern 304.

The DVD unrequited beams 414, 415 are formed only by the central portion of the DVD/CD-shared grating pattern 358 since the area of the CD optimum pattern 304 is located only at the central portion thereof. The DVD sub-optical beams 402, 403, on the other hand, lack the central portion since the area of the DVD optimum pattern 360 is located in the remaining portions of the DVD/CD-shared grating pattern 358 other than the CD optimum pattern 304.

Incidentally, the center of the optical beams 400, 410 preferably coincide with the center of the area of the CD optimum pattern 304. Though low in sensitivity, the light quantity variation of the DVD and CD optical beams can be reduced.

The spectral ratio between the main optical beam and the sub-optical beams into which the original optical beam is split by an ordinary linear grating (shown in FIGS. 6A, 6B) is dependent on the depth of the grating grooves and the duty factor standardized by the wavelength of the grating. The depth of the grating grooves and the duty factor of the DVD/CD-shared grating pattern 358, therefore, are preferably constant also in the areas of the DVD optimum pattern and the CD optimum pattern. In the case where the depth of the grating grooves and the duty factor of the DVD/CD-shared grating pattern 358 are different between the areas of the DVD optimum pattern and the CD optimum pattern, for example, the light quantity of the main optical beams 401, 411 constituting the 0th order diffracted light would be varied from one area to another, and the first bright ring of the focused light spot radiated on the optical disc would be increased, resulting in the deterioration of the reproduction performance.

In the case where the DVD and CD are arranged separately from each other, the light quantity ratio $\xi$ between the main optical beam and one sub-optical beam (the quantity of the sub-optical beam divided by the quantity of the main optical beam) often used in an ordinary optical pickup is about 0.067. Also, in this case, the light quantity ratio $\eta$ between the optical beam entering the grating and the main optical beam leaving the grating (the light quantity of the main optical beam divided by the light quantity of the incident optical beam) is about 0.88.

Assume that the light quantity ratio $\xi$ of the ordinary linear grating is applied to the DVD. In the case where the CD optical beam enters the grating of which the light quantity ratio is determined for the DVD, the light quantity ratio $\xi$ is changed due to the wavelength difference between CD and DVD. For example, $\xi \approx 0.067$ for DVD and $\xi \approx 0.045$ for CD. The same phenomenon is considered to occur in the DVD/CD-shared grating pattern 358. In the case where the depth of the grating grooves and the duty factor are determined in such a manner that the light quantity ratio $\xi \approx 0.067$ for DVD, for example, this is equivalent to the fact that the ratio between the light quantity of the DVD main optical beam 411 and the sum of the light quantities of the DVD sub-optical beam 412 and the DVD unrequited optical beam 414 is 0.067. Specifically, the ratio $\xi 1$ between the light quantity of the DVD main optical beam 411 and the light quantity of the DVD sub-optical beam is smaller than 0.067. This indicates that the light quantity of the DVD sub-optical beam is smaller than in the prior art.

In the ordinary single-layer DVD, the small light quantity of the sub-optical beam basically poses no problem if the S/N of the detector is proper. The two-layer DVD which has been standardized, however, poses a problem. The problem posed by the two-layer DVD is explained below with reference to FIG. 21.

Figure 21:
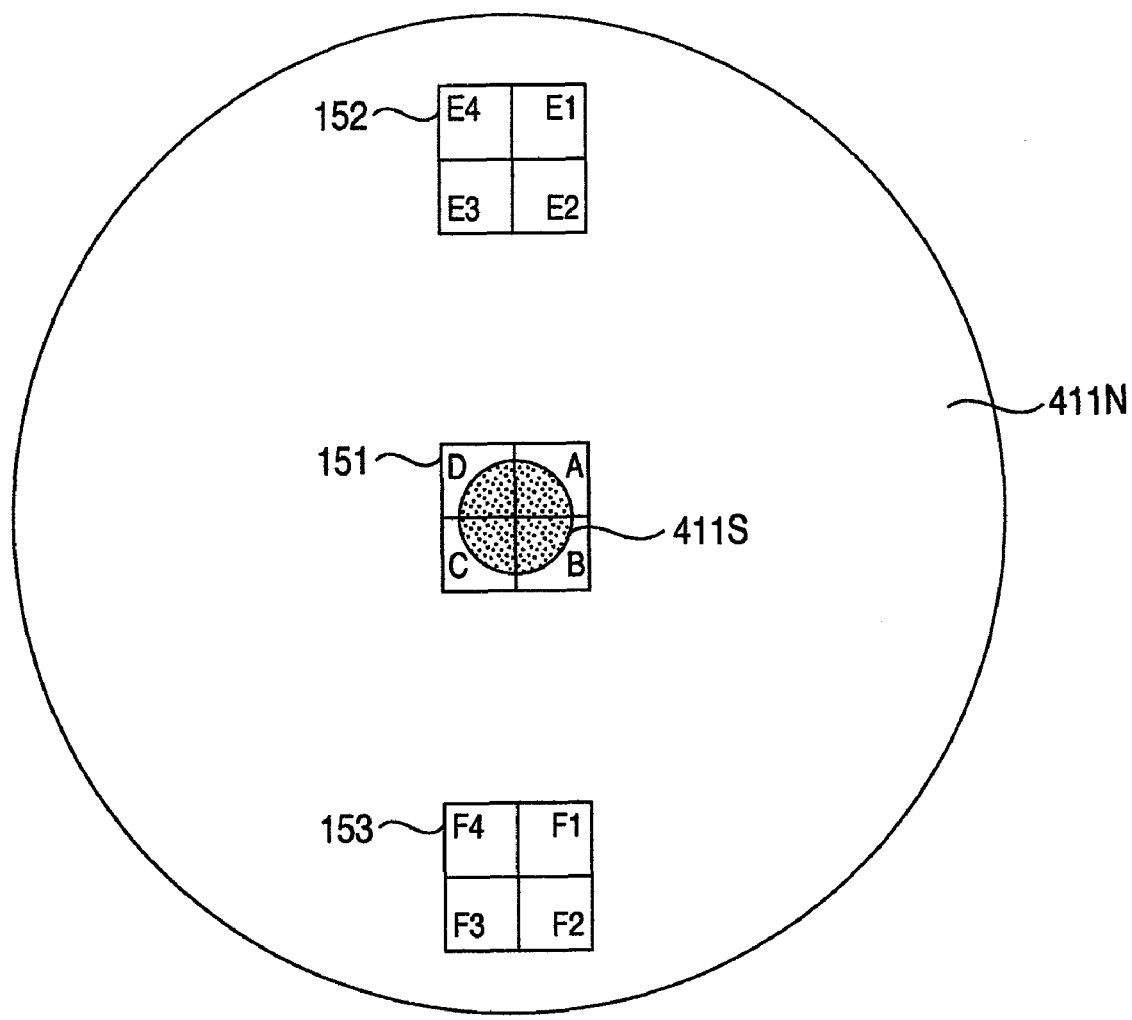
FIG. 21 is a diagram for explaining the problems of the two-layer DVD according to the 12th embodiment.

FIG. 21 shows the manner in which the DVD main optical beam 411 reflected from the two-layer DVD is radiated on the detector 150. In FIG. 21, the CD light receiving area and the connections of the detector 150 are not shown. In the case where the reproduce operation is performed on a predetermined information-recorded surface of the two-layer DVD, the DVD main optical beam radiated and focused on the predetermined information-recorded surface is reflected on the information-recorded surface and radiated in the light receiving area 151. This radiated light is a spot 411S shown in FIG. 21. The DVD main optical beam is also reflected on the other information-recorded surface than the predetermined information-recorded surface of the two-layer DVD and radiated on the detector 150. This radiated light is a spot 411N shown in FIG. 21. On the other information-recorded surface, the DVD main optical beam is not focused, and therefore, the DVD main optical beam radiated on the detector is not focused either. Thus, a large image like the spot 411N is formed. This spot 411N enters the light receiving areas 152, 153 as a noise. As long as the light quantity of the sub-optical beam is sufficiently large, the small noise of the spot 411N has no effect. In the case where the light quantity of the DVD sub-optical beam is smaller than in the prior art as in this invention, however, the effect of the noise is not negligible. Incidentally, the two-layer CD is not standardized, and therefore, the small light quantity thereof basically poses no problem.

Now, a solution to the aforementioned problem of the two-layer DVD is explained.

First, the area of the CD optimum pattern is increased as compared with the area of the DVD optimum pattern of the DVD/CD-shared grating pattern 358. More specifically, the area of the DVD optimum pattern is set to two thirds and the area of the CD optimum pattern to one third of the effective area of the DVD optical beam 410. Also, by setting the grating groove depth and the duty factor of the grating, the light quantity ratio $\xi \approx 0.1$ of the linear grating is used for the wavelength of DVD.

Specifically, in the case where the grating groove depth and the duty factor are set with the DVD light quantity $\xi \approx 0.1$, the ratio between the light quantity of the DVD main optical beam 411 and the sum of the light quantities of the DVD sub-optical beam 412 and the DVD unrequited optical beam 414 becomes 0.1. In the case where the light quantities of the DVD sub-optical beam 412 and the DVD unrequited optical beam 414 are approximated in terms of the area ratio, the ratio $\xi 1$ between the light quantity of the DVD main optical beam 411 and the light quantity of the DVD sub-optical beam 412 is given as $0.1 \times 2 \div 3 \approx 0.067$.

By setting this way, the light quantity of the DVD sub-optical beam 412 becomes as large as in the prior art, and therefore, the effect of the noise can be ignored even in the reproduce operation of the two-layer DVD.

In this case, the ratio η between the light quantity of the optical beam incident to the grating and the light quantity of the main optical beam exiting from the grating is about 0.83.

On the other hand, the ratio between the light quantity of the CD main optical beam 401 and the sum of the light quantities of the CD sub-optical beam 404 and the CD unrequired optical beam 402 is about 0.45. In the case where the light quantities of the CD sub-optical beam 401 and the CD unrequired optical beam 402 are approximated in terms of the area ratio, the ratio $\xi 2$ between the light quantity of the CD main optical beam 401 and the light quantity of the CD sub-optical beam 404 is given as $0.045 \times 1 \div 3 \approx 0.015$. The value of this magnitude is considered to pose no S/N problem of the detector.

Incidentally, although the area of the DVD optimum pattern is set to two thirds and the area of the CD optimum pattern to one third of the effective area of the DVD optical beam 410, the area of the DVD optimum pattern can be conversely decreased. In this case, however, the value η is decreased for an undesirably reduced transmittance of the main optical beam. Specifically, the area of the DVD optimum pattern is more desirably increased in size as compared with the area of the CD optimum pattern. Similarly, the relation $\xi 1 < \xi 2$ can be held depending on the design of the grating. Since the transmittance of the main optical beam is reduced, however, the relation $\xi > \xi 2$ is more desirable.

Thirteenth Embodiment

Figure 22:
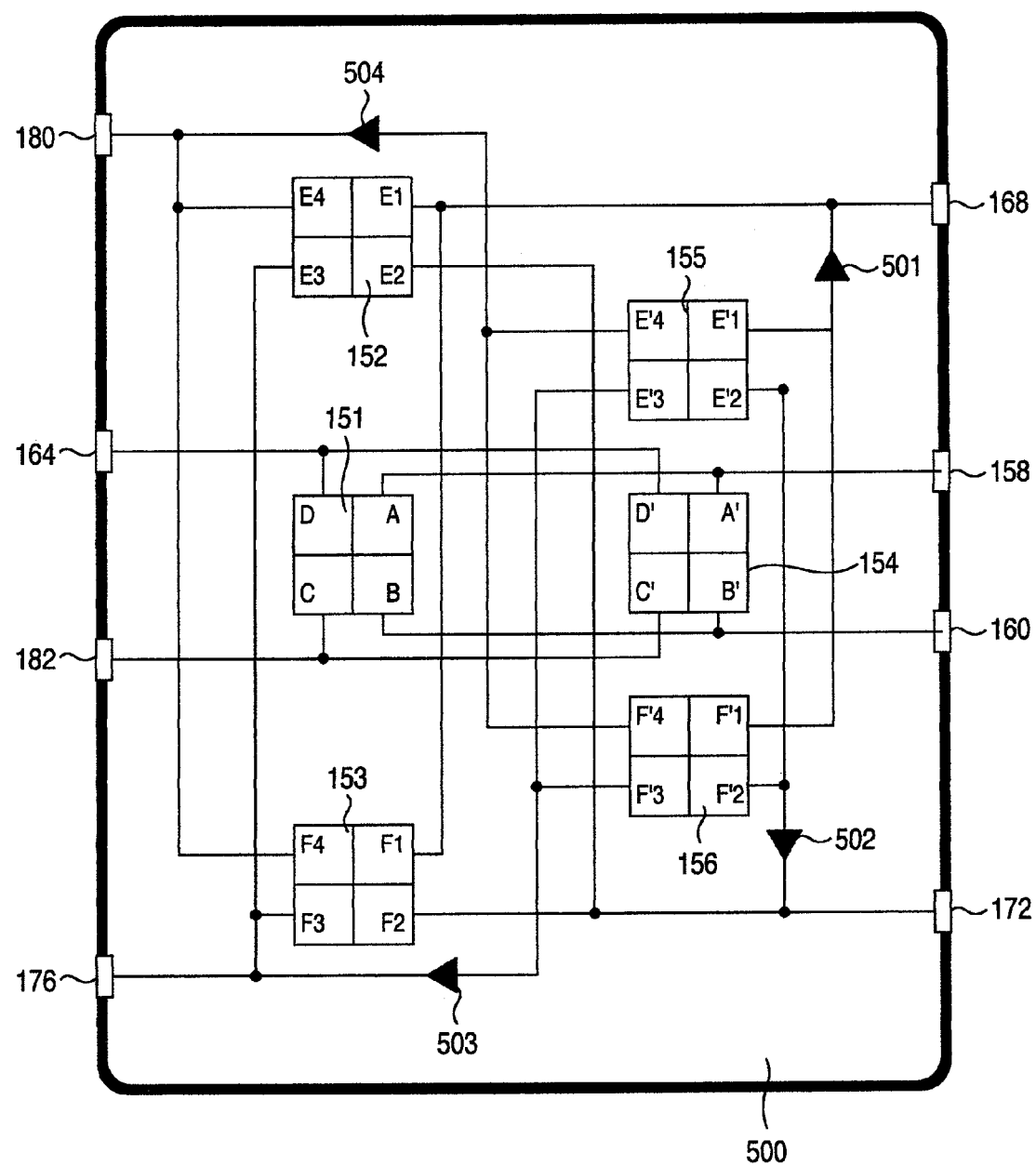
FIG. 22 is a diagram for explaining the internal connection of the detector according to a 13th embodiment.

The 13th embodiment represents a modification of the internal connection of the detector described in the sixth embodiment. FIG. 22 shows the internal connection of the detector 500.

The detector 500, like the detector 150, has six detection areas 151, 152, 153, 154, 155, 156, each divided into four parts. Thus, the detection area 151 has detection surfaces A, B, C, D, the detection area 152 detection surfaces E1, E2, E3, E4, the detection area 153 detection surfaces F1, F2, F3, F4, the detection area 154 detection surfaces A', B', C', D', the detection area 155 detection surfaces E'1, E'2, E'3, E'4, and the detection area 156 detection surfaces F'1, F'2, F'3, F'4.

The detection surfaces A and A' are added to each other by an add circuit (black circle) arranged in the detector 500, so that a signal (A+A') is output from an output pin 158.

The detection surfaces B and B' are added to each other by an add circuit arranged in the detector 500, so that a signal (B+B') is output from an output pin 160.

The detection surfaces C and C' are added to each other by an add circuit arranged in the detector 500, so that a signal (C+C') is output from an output pin 162.

The detection surfaces D and D' are added to each other by an add circuit arranged in the detector 500, so that a signal (D+D') is output from an output pin 164.

The detection surfaces E'1 and F'1, after being added to each other by the add circuit arranged in the detector 500, are increased to K times as large by an amplifier 501. Also, the detection surfaces E1 and F1 are added to each other by the add circuit arranged in the detector 500. Further, the resulting two signals are added to each other by the add circuit, so that a signal (E1+F1+W×(E'1+F'1)) is output from an output pin 168.

The detection surfaces E'2 and F'2, after being added to each other by the add circuit arranged in the detector 500, are increased to K times as large by an amplifier 502. Also, the detection surfaces E2 and F2 are added to each other by the add circuit arranged in the detector 500. Further, the resulting two signals are to each other by the add circuit, so that a signal (E2+F2+W×(E'2+F'2)) is output from an output pin 172.

The detection surfaces E'3 and F'3, after being added to each other by the add circuit arranged in the detector 500, are increased to K times as large by an amplifier 503. Also, the detection surfaces E3 and F3 are added to each other by the add circuit arranged in the detector 500. Further, the resulting two signals are added to each other by the add circuit, so that a signal (E3+F3+W×(E'3+F'3)) is output from an output pin 176.

The detection surfaces E'4 and F'4, after being added to each other by the add circuit arranged in the detector 500, are increased to K times as large by an amplifier 504. Also, the detection surfaces E4 and F4 are added to each other by the add circuit arranged in the detector 500. Further, the resulting two signals are added to each other by the add circuit, so that a signal (E4+F4+W×(E'4+F'4)) is output from an output pin 180.

Incidentally, each detection signal can be detected by Equations 9, 10 and 15 to 18. In Equations 15 to 18 shown below, the output pin 180, for example, is designated as P180.

$$\begin{aligned}\text{DVD focusing error signal} &= [(P158+P162)-(P160+\\ &\quad P164)]+k\times[(P168+P176)-(P172+P180)]=[(A+\\ &\quad C)-(B+D)]+k\times\{[(E1+E3)-(E2+E4)]+[(F1+F3)-\\ &\quad (F2+F4)]\}+[(A'+C')-(B'+D')]+k\times W\times\{[(E'1+\\ &\quad E'3)-(E'2+E'4)]+[(F'1+F'3)-(F'2+F'4)]\}=[(A+\\ &\quad C)-(B+D)]+k\times\{[(E1+E3)-(E2+E4)]+[(F1+F3)-\\ &\quad (F2+F4)]\}\end{aligned} \quad (15)$$

In this case, the CD laser light source is not turned on for the DVD record/reproduce operation, and therefore, the detection signals from the detection areas 154, 155, 156 are 0.

$$\begin{aligned}\text{CD focusing error signal} &= [(P158+P162)-(P160+\\ &\quad P164)]+k\times[(P168+P176)-(P172+P180)]=[(A+\\ &\quad C)-(B+D)]+k\times\{[(E1+E3)-(E2+E4)]+[(F1+F3)-\\ &\quad (F2+F4)]\}+[(A'+C')-(B'+D')]+k\times W\times\{[(E'1+\\ &\quad E'3)-(E'2+E'4)]+[(F'1+F'3)-(F'2+F'4)]\}=[(A'+\\ &\quad C')-(B'+D')]+k\times W\times\{[(E'1+E'3)-(E'2+E'4)]+\\ &\quad [(F'1+F'3)-(F'2+F'4)]\}\end{aligned} \quad (16)$$

In this case, the DVD laser light source is not turned on for the CD record/reproduce operation, and therefore, the detection signals from the detection areas 151, 152, 153 are 0.

$$\begin{aligned}\text{DVD tracking error signal} &= [(P158+P164)-(P160+\\ &\quad P162)]+k\times[(P168+P180)-(P172+P176)]=[(A+\\ &\quad D)-(B+C)]-k\times\{[(E1+E4)-(E2+E3)]+[(F1+F4)-\\ &\quad (F2+F3)]\}+[(A'+D')-(B'+C')]-k\times W\times\{[(E'1+\\ &\quad E'4)-(E'2+E'3)]+[(F'1+F'4)-(F'2+F'3)]\}=[(A+\\ &\quad D)-(B+C)]+k\times\{[(E1+E4)-(E2+E3)]+[(F1+F4)-\\ &\quad (F2+F3)]\}\end{aligned} \quad (17)$$

In this case, the CD laser light source is not turned on for the DVD record/reproduce operation, and therefore, the detection signals from the detection areas 154, 155, 156 are 0.

$$\begin{aligned}\text{CD tracking error signal} &= [(P158+P164)-(P160+\\ &\quad P162)]+k\times[(P168+P180)-(P172+P176)]=[(A+\\ &\quad D)-(B+C)]-k\times\{[(E1+E4)-(E2+E3)]+[(F1+F4)-\\ &\quad (F2+F3)]\}+[(A'+D')-(B'+C')]-k\times W\times\{[(E'1+\\ &\quad E'4)-(E'2+E'3)]+[(F'1+F'4)-(F'2+F'3)]\}=[(A'+\\ &\quad D')-(B'+C')]-k\times W\times\{[(E'1+E'4)-(E'2+E'3)]+\\ &\quad [(F'1+F'4)-(F'2+F'3)]\}\end{aligned} \quad (18)$$

In this case, the DVD laser light source is not turned on for the CD record/reproduce operation, and therefore, the detection signals from the detection areas 151, 152, 153 are 0.

Incidentally, the character k is a coefficient for correcting the light quantity ratio between the main optical beam and the sub-optical beams of the DVD.

As explained in the 12th embodiment, the light quantity ratio ξ1 between the main optical beam and the sub-optical beams of the DVD and the light quantity ratio ξ2 between the main optical beam and the sub-optical beams of the CD are considerably variable with each other, and therefore, the gain W of the amplifier is desirably set to the proportionality constant of ξ1 and ξ2. By doing so, as explained in the sixth embodiment, the optical drive is not required to have two different gains k and k', thereby simplifying the circuit configuration of the optical drive.

In other words, let S1 be the output produced from the light receiving area 151, S2 the output produced from the light receiving area 152, S3 the output produced from the light receiving area 153, S4 the output produced from the light receiving area 154, S5 the output produced from the light receiving area 155, and S6 the output produced from the light receiving area 156. An amplifier for increasing to W times as large is arranged to secure the relation S1÷(S2+S3)=W×S4÷(S5+S6). As an alternative, in the optical drive, let S1 be the output produced from the light receiving area 151, S2 the output produced from the light receiving area 152, S3 the output produced from the light receiving area 153, S4 the output produced from the light receiving area 154, S5 the output produced from the light receiving area 155, and S6 the output produced from the light receiving area 156. An amplifier having the function k'=W×k is arranged to secure the relation S1÷(S2+S3)=W×S4÷(S5+S6).

According to the embodiments described above, the light receiving areas of the DVD and the CD are connected completely. Nevertheless, a change-over switch to turn off the output of the CD light receiving area during the DVD reproduction or to turn off the output of the DVD light receiving area during the CD reproduction may be arranged in the detector without any problem.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical pickup comprising:
   a first laser light source for emitting an optical beam of a first wavelength;
   a second laser light source for emitting an optical beam of a second wavelength longer than the first wavelength;
   an objective lens for focusing the optical beams of the first and second wavelength on the information-recorded surface of an optical disc;
   a detector for receiving the optical beams of the first and second wavelength reflected on the information-recorded surface of the optical disc; and
   a grating interposed between the objective lens and the first and second laser light sources for emitting the optical beams of the first and second wavelength to split each of the optical beams of the first and second wavelength into at least one main optical beam and two sub-optical beams;
   wherein the grating is so configured that a first grating pattern area for splitting the optical beam of the first wavelength and a second grating pattern area for splitting the optical beam of the second wavelength are arranged in a single plane;
   wherein the first and second grating pattern areas have a predetermined grating groove depth and a predetermined duty factor;
   wherein the first grating pattern area of the grating is larger than the second grating pattern area of the grating; and
   wherein the relation η≦0.83 holds, where η is the ratio between the light quantity of the optical beam of the first wavelength incident to the grating and the light quantity of the main optical beam of the first wavelength obtained from the incident optical beam split by the grating.

2. The optical pickup according to claim 1,
   wherein the detector includes:
   a first light receiving area for receiving the main optical beam contained in the optical beam emitted from the laser light source of the first wavelength and split by the first grating pattern area of the grating and second and third light receiving areas for receiving the two sub-optical beams, and
   a fourth light receiving area for receiving the main optical beam contained in the optical beam emitted from the laser light source of the second wavelength and split by the second grating pattern area of the grating and fifth and sixth light receiving areas for receiving the two sub-optical beams.

3. The optical pickup according to claim 2, wherein an amplifier for increasing to W times as large is arranged to secure the relation $S1 \div (S2+S3) = W \times S4 \div (S5+S6)$, where S1 is the output obtained from the first light receiving area of the detector, S2 the output obtained from the second light receiving area of the detector, S3 the output obtained from the third light receiving area of the detector, S4 the output obtained from the fourth light receiving area of the detector, S5 the output obtained from the fifth light receiving area of the detector, and S6 the output obtained from the sixth light receiving area of the detector.

4. An optical drive carrying the optical pickup described in claim 2, wherein an amplifier for increasing to W times as large is arranged to secure the relation $S1 \div (S2+S3) = W \times S4 \div (S5+S6)$, where S1 is the output obtained from the first light receiving area of the detector, S2 the output obtained from the second light receiving area of the detector, S3 the output obtained from the third light receiving area of the detector, S4 the output obtained from the fourth light receiving area of the detector, S5 the output obtained from the fifth light receiving area of the detector, and S6 the output obtained from the sixth light receiving area of the detector.

5. An optical pickup, comprising:
a first laser light source for emitting an optical beam of a first wavelength;
a second laser light source for emitting an optical beam of a second wavelength longer than the first wavelength;
an objective lens for focusing the optical beams of the first and second wavelength on the information-recorded surface of an optical disc;
a detector for receiving the optical beams of the first and second wavelength reflected on the information-recorded surface of the optical disc;
a grating interposed between the objective lens and the first and second laser light sources for emitting the optical beams of the first and second wavelength to split each of the optical beams of the first and second wavelength into at least one main optical beam and two sub-optical beams;
wherein the grating is so configured that a first grating pattern area for splitting the optical beam of the first wavelength and a second grating pattern area for splitting the optical beam of the second wavelength are arranged in a single plane;
wherein the first and second grating pattern areas have a predetermined grating groove depth and a predetermined duty factor;
wherein the first grating pattern area of the grating is larger than the second grating pattern area of the grating;
wherein $\xi 1$ and $\xi 2$ are different in value from each other, where $\xi 1$ is the light quantity ratio between the main optical beam and the sub-optical beam of the first wavelength obtained from the incident optical beam split by the grating, and $\xi 2$ is the light quantity ratio between the main optical beam and the sub-optical beam of the second wavelength obtained from the incident optical beam split by the grating;
wherein the relational $\xi 1 > \xi 2$ holds;
wherein the detector includes:
a first light receiving area for receiving the main optical beam contained in the optical beam emitted from the laser light source of the first wavelength and split by the first grating pattern area of the grating and second and third light receiving areas for receiving the two sub-optical beams; and
a fourth light receiving area for receiving the main optical beam contained in the optical beam emitted from the laser light source of the second wavelength and split by the second grating pattern area of the grating and fifth and sixth light receiving areas for receiving the two sub-optical beams; and
wherein an amplifier for increasing to W times as large is arranged to secure the relation $S1 \div (S2+S3) = W \times S4 \div (S5+S6)$, where S1 is the output obtained from the first light receiving area of the detector, S2 the output obtained from the second light receiving area of the detector, S3 the output obtained from the third light receiving area of the detector, S4 the output obtained from the fourth light receiving area of the detector, S5 the output obtained from the fifth light receiving area of the detector, and S6 the output obtained from the sixth light receiving area of the detector.

6. An optical drive carrying an optical pickup comprising:
a first laser light source for emitting an optical beam of a first wavelength;
a second laser light source for emitting an optical beam of a second wavelength longer than the first wavelength;
an objective lens for focusing the optical beams of the first and second wavelength on the information-recorded surface of an optical disc;
a detector for receiving the optical beams of the first and second wavelength reflected on the information-recorded surface of the optical disc;
a grating interposed between the objective lens and the first and second laser light sources for emitting the optical beams of the first and second wavelength to split each of the optical beams of the first and second wavelength into at least one main optical beam and two sub-optical beams;
wherein the grating is so configured that a first grating pattern area for splitting the optical beam of the first wavelength and a second grating pattern area for splitting the optical beam of the second wavelength are arranged in a single plane;
wherein the first and second grating pattern areas have a predetermined grating groove depth and a predetermined duty factor;
wherein the first grating pattern area of the grating is larger than the second grating pattern area of the grating;
wherein $\xi 1$ and $\xi 2$ are different in value from each other, where $\xi 1$ is the light quantity ratio between the main optical beam and the sub-optical beam of the first wavelength obtained from the incident optical beam split by the grating, and $\xi 2$ is the light quantity ratio between the main optical beam and the sub-optical beam of the second wavelength obtained from the incident optical beam split by the grating;
wherein the relational $\xi 1 > \xi 2$ holds;
wherein the detector includes:
a first light receiving area for receiving the main optical beam contained in the optical beam emitted from the laser light source of the first wavelength and split by the first grating pattern area of the grating and second and third light receiving areas for receiving the two sub-optical beams; and
a fourth light receiving area for receiving the main optical beam contained in the optical beam emitted from the laser light source of the second wavelength and split by the second grating pattern area of the grating and fifth and sixth light receiving areas for receiving the two sub-optical beams; and wherein an amplifier for increasing to W times as large is arranged to secure the relation $S1/(S2+S3)=W \times S4/(S5+S6)$, where S1 is the output obtained from the first light receiving area of the detector, S2 the output obtained from the second light receiving area of the detector, S3 the output obtained from the third light receiving area of the detector, S4 the output obtained from the fourth light receiving area of the detector, S5 the output obtained from the fifth light receiving area of the detector, and S6 the output obtained from the sixth light receiving area of the detector.

* * * * *